United States Patent [19]
Kito et al.

[11] Patent Number: 6,164,101
[45] Date of Patent: *Dec. 26, 2000

[54] KEY WITH BUILT-IN TRANSMITTING ELEMENT

[75] Inventors: Shozo Kito; Naokatsu Okamura; Yoshinobu Ohyabu; Toshiharu Katagiri; Hiroyuki Sugiyama, all of Aichi-ken, Japan

[73] Assignee: Kabushiki Kaisha Tokairika Denki Seisakusho, Aichi, Japan

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/979,874

[22] Filed: Nov. 26, 1997

Related U.S. Application Data

[63] Continuation of application No. 08/583,044, filed as application No. PCT/JP95/00971, May 19, 1995, abandoned.

[30] Foreign Application Priority Data

| May 20, 1994 | [JP] | Japan | 6-107274 |
| May 20, 1994 | [JP] | Japan | 6-107291 |
| Dec. 28, 1994 | [JP] | Japan | 6-327779 |

[51] Int. Cl.$^7$ ..................................... E05B 19/04
[52] U.S. Cl. .............................. 70/278.3; 70/395; 70/408
[58] Field of Search .................... 70/408, 275, 277–279, 70/256, 395, 397, 400, 460; 340/825.31

[56] References Cited

U.S. PATENT DOCUMENTS

| 4,287,735 | 9/1981 | Brunken et al. ........................ 70/395 |
| 4,562,712 | 1/1986 | Wolter .................................. 70/408 X |
| 4,922,736 | 5/1990 | Tanaka et al. ....................... 70/408 X |
| 5,117,097 | 5/1992 | Kimura et al. ....................... 70/278 X |
| 5,337,588 | 8/1994 | Chhatwal .............................. 70/278 |
| 5,433,096 | 7/1995 | Janssen et al. .......................... 70/278 |
| 5,632,168 | 5/1997 | Yano .................................... 70/408 X |
| 5,727,408 | 3/1998 | Mizuno et al. ...................... 70/408 X |
| 5,768,925 | 6/1998 | Ozawa et al. ............................ 70/408 |
| 5,819,564 | 10/1998 | Watanuki ................................. 70/408 |
| 6,035,677 | 3/2000 | Janssen et al. ...................... 70/408 X |

FOREIGN PATENT DOCUMENTS

| 46299/93 | 3/1994 | Australia . |
| 648589 | 4/1995 | European Pat. Off. . |
| 30 05 890 | 9/1980 | Germany . |
| 35 09 579 | 9/1986 | Germany . |
| 63-27664 | 2/1988 | Japan . |
| 63-86266 | 6/1988 | Japan . |
| 1-67859 | 7/1988 | Japan . |
| 64-33876 | 3/1989 | Japan . |
| 4-6462 | 1/1992 | Japan . |
| 4011179 | 1/1992 | Japan .................................. 70/395 |
| 7-238721 | 12/1995 | Japan . |
| 7-238722 | 12/1995 | Japan . |

*Primary Examiner*—Suzanne Dino Barrett
*Attorney, Agent, or Firm*—Oliff & Berridge, PLC

[57] ABSTRACT

A container made from a hard synthetic resin is provided on a key body (12). A container half (26) and the other container half (27) of the container (16) are attached to a key body (12) and a transmitting element (18) is secured to the container halves (26) and (27) in a sealed condition. A soft resin outer skin is molded on the outer surfaces of the key body (12) and the resin container (16). Heat and pressure during the molding of the resin outer skin are received by the resin container (16) so that the transmitting element 18 therein is protected therefrom.

20 Claims, 33 Drawing Sheets

F I G. 2 9
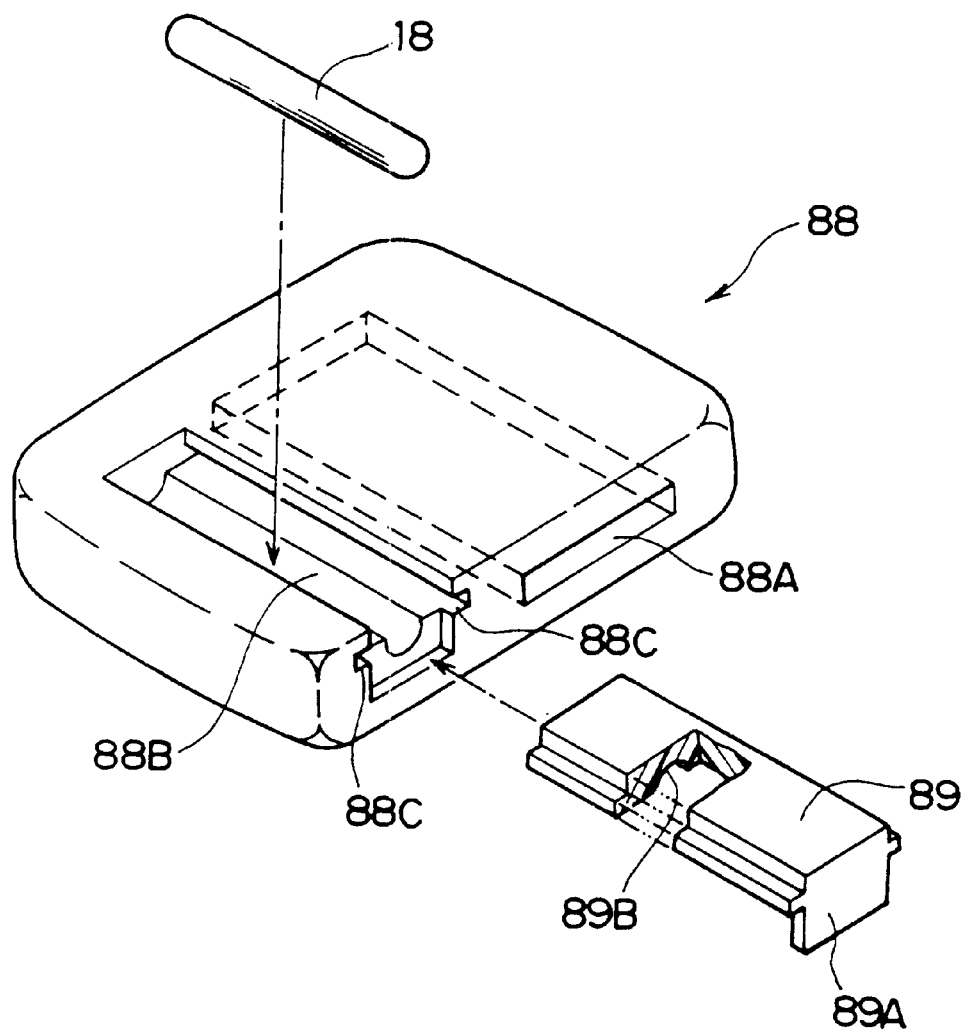

F I G. 30
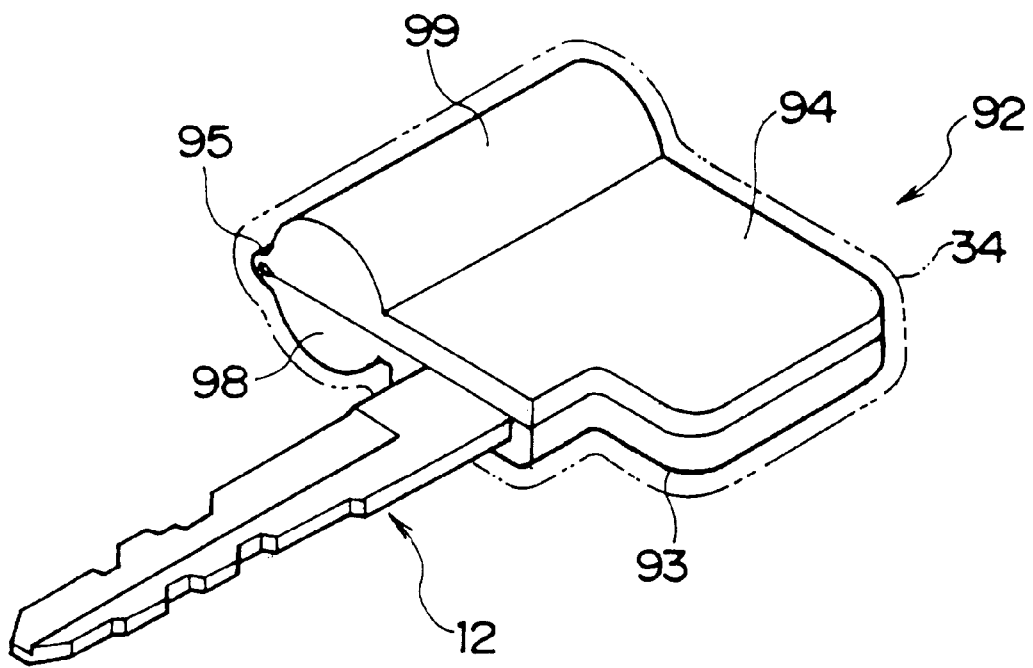

F I G. 3 2
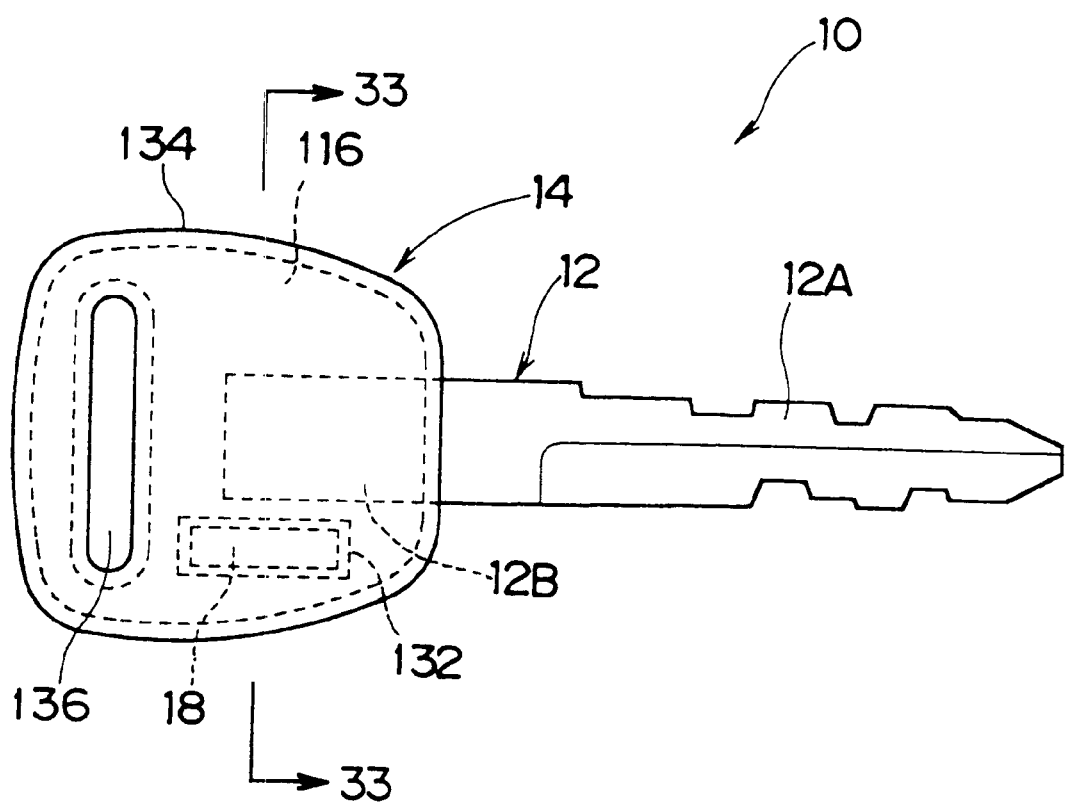

F I G. 33
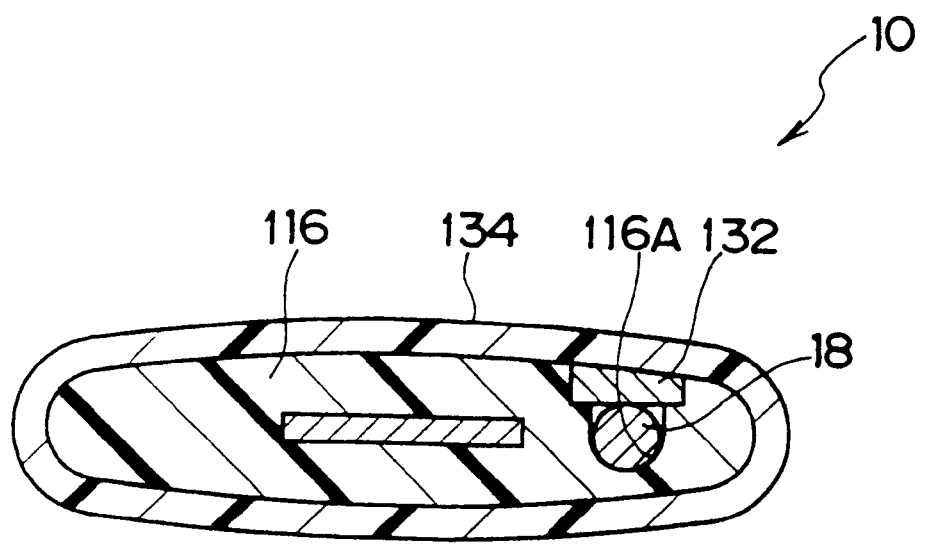

KEY WITH BUILT-IN TRANSMITTING ELEMENT

This is a Continuation of application Ser. No. 08/583,044 filed Jan. 17, 1996 now abandoned, which is a 371 of PCT/JP95/00971 filed May 19, 1995.

FIELD OF TECHNOLOGY

The present invention relates to a key with a built-in transmitting element in which a transmitting element is built-in at the interior of the key.

BACKGROUND OF TECHNOLOGY

Conventionally, to unlock a lock with a key, a plurality of pins provided at the internal cylinder of the lock are driven by mechanical projections and recesses or a magnetic force by an embedded magnet formed at the insertion portion of the key body so that pins bridging over the boundary surface of the internal cylinder and the fixed external cylinder are moved, and the internal cylinder is rotated within the external cylinder. However, when a combination of a mechanical key and a lock is used, the lock can be unlocked, if a reproduced key has the same shape as that of an original key. In addition, it is difficult to make defensive structures against destructive activities with such combination. In particular, in case of keys for vehicles, since an engine starter can be operated by directly connecting electric wires without using the key, it is difficult to achieve complete key functions by use of a conventional combination of a key and a lock.

To solve this problem, in addition to the insertion portion of a key having mechanical projections and recesses or magnetic force generating portion, a key with a built-in transmitting element for transmitting a specified ID code has been proposed. According to an embodiment of such key, only when a receiving element installed in a vehicle receives the specified ID code, the engine of the vehicle can be started or continuously operated so that the movement of the vehicle due to a direct connection of electric wires or mechanical destruction can be prevented.

Since the transmitting element is required for such conditions that the transmitting element is small and metal portions are not disposed on the periphery of the transmitting element, the transmitting element is not generally disposed at the insertion portion of the key body, but at a grip portion (key knob) formed by non-metallic member such as resin which does not interfere in transmitting functions. Further, when a battery is exhausted, since the transmitting element cannot transmit the ID code and the vehicle engine cannot be started, a key with a built-in transmitting element which is not necessary for a battery has been adopted in recent years. However, since it is necessary to apply heat or pressure to form the grip portion with non-metallic member such as resin, there is such a problem that the transmitting element is damaged by the heat or the pressure. Further, since the grip portion is formed by non-metallic member such as resin, there is also such a problem that the transmitting element is damaged due to an external force applied to the transmitting element by rotating the key body.

Furthermore, since the grip portion is merely assembled with the key body, there is also such a problem that a gap between the grip portion and the key body may be formed by the external force applied to the key body.

DISCLOSURE OF THE INVENTION

In view of the above-described facts, an object of the present invention is to provide a key with a built-in transmitting element which is strong against an external force such as torsion, and which can endure the pressure and temperature for molding when the transmitting element is built-in in the key.

The present invention is characterized by comprising: a metal key body having a insertion portion; a transmitting element; a hard non-metal container in which the transmitting element is built-in in a sealed condition; a holding member for mounting the hard container; and a soft outer skin formed on an external periphery of the hard container.

Here, the sealed condition is a state in which molding resin is not adverse effect on the transmitting element due to a high temperature and a high pressure when the soft outer skin is formed and a state which ensures conditions in which original transmitting functions of the transmitting element can be maintained. Accordingly, an airtight condition is not necessarily required. Therefore, the container may be made of hard material which can endure the heat and pressure for molding the soft outer skin. On the other hand, the soft outer skin has a function of integrally molding the container onto the key body, and at the same time, operating feelings when the key is used is improved by softening the exposed external periphery after molded. In embodiments for mounting the transmitting element into the hard non-metal container, the transmitting element can be built-in in such a manner that a hole for inserting and accommodating the transmitting element into the container is provided, or an opening and closing structure or a separating structure of the container is provided. The built-in position may be the interior of a grip portion. The holding member for mounting the hard container to the key body may not be integrally molded, but may have a structure in which the container is mechanically mounted to the key body in such a manner that the key body and the container have a projection and a recess so as to be fitted one another, or the container may be a opening/closing structure or a separating structure to hold the key body. Alternatively, the container may have a hole for inserting and accommodating the key.

In accordance with a key with a built-in transmitting element of the present invention, a transmitting element is built-in in a hard non-metal container in a sealed condition and the hard non-metal container is mounted onto the key body with a holding member. Thereafter, a soft outer skin is molded on the outer periphery of the non-metal container. When the soft outer skin is molded, the transmitting element in the non-metal container is protected from heat and pressure for molding.

In addition, by constituting so as to comprise a metal key body having a insertion portion, a hard non-metal covering member, a transmitting element which is accommodated in a sealed condition within a accommodation portion formed by the key body and the hard non-metal covering member, and a soft outer skin which is molded on the outer periphery of the hard covering member and the key body and which connects the covering member and the key body, the soft outer skin is molded after the transmitting element has been accommodated in a sealed condition within the accommodating portion formed by the key body and the hard non-metal covering member so that the hard covering member and the key body are connected, and the transmitting element can be protected from the heat and the external pressure by the hard non-metal covering member when the outer skin is molded. Here, the covering member, which is different from the hard non-metal container, is not necessarily shaped in an accommodating container and may be shaped in a cover or a plate.

Further, by constituting so as to comprise a transmitting element, a hard non-metal container into which a part of a metal key body is insert-molded and the transmitting element is built-in in a sealed condition, and a soft outer skin molded on the outer periphery of the hard container, the transmitting element having a transmitting member is built-in in the hard non-metal container into which a part of the metal key body is insert-molded in a sealed condition, and a soft outer skin is molded on the periphery thereof, so that the transmitting element can endure the pressure and heat for molding when the soft outer skin is molded on the outer periphery of the hard non-metal container and the transmitting element built in the hard container is not damaged when an external force such as torsion and the like is applied to the soft outer skin.

Furthermore, by constituting so as to comprise a transmitting element, a hard non-metal container in which a part of a metal key body is insert-molded and the transmitting element is accommodated in the accommodating portion of the container, and which is covered by a cover member in a sealed condition, and a soft outer skin molded on the outer periphery of the hard container, the transmitting element can endure the pressure and heat for molding when the soft outer skin is molded on the outer periphery of the hard non-metal container, and the transmitting element built-in in the hard container is not damaged when an external force such as torsion and the like is applied to the soft outer skin since the soft outer skin is molded on the container and the cover member after the transmitting element has been accommodated in the accommodating portion provided in the hard non-metal container and covered by the cover member in a sealed condition.

Moreover, by constituting so as to comprise a transmitting element, a hard non-metal container in which a part of a metal key body is insert-molded and the transmitting element is built-in in a sealed condition by making a connected state from a separated state, and a soft outer skin molded on the outer periphery of the hard container, the transmitting element in the hard container can endure an external force and external pressure during the molding of the soft resin, since the transmitting element is accommodated in the interior of the hard non-metal container in a sealed condition by making the connected state from the separated state of the hard container and the hard non-metal container is covered with the soft outer skin.

In addition, by constituting so as to comprise a transmitting element, a hard non-metal container in which a part of a metal key body is insert-molded and the transmitting element is built-in in a sealed condition by making a closed state from an opened state, and a soft outer skin molded on the outer periphery of the hard container, the transmitting element in the hard container can endure an external force and pressure during the molding of the soft resin, since the transmitting element is accommodated in the interior of the hard non-metal container in a sealed condition by making the hard non-metal container in the closed state from the opened state and the soft resin outer skin is molded on the outer periphery of the container in the closed state of the container so that the hard non-metal container is covered with the soft outer skin.

In addition, by constituting so as to comprise a metal key body having an insertion portion into a lock, a hard resin container with a built-in transmitting element in the interior thereof in a sealed condition, and a soft resin for connecting the key body and the resin container by molding the soft resin on the outer periphery of the insertion portion and the resin container, the transmitting element is protected from an external force and temperature by the hard resin container during molding, since the hard resin container in which the transmitting element is built-in and the metal key body are connected by molding the soft resin.

A key with a built-in transmitting element in which the transmitting element is accommodated in a grip portion formed by molding resin in the base portion of the key body may comprise a holder portion for covering the base portion of the key body, an accommodating portion formed in the holder portion for accommodating the transmitting element, a covering member for covering the accommodating portion by fitting into an opening of the accommodating portion, and a protector portion formed by a molding resin for covering the holder portion in a state where the accommodation portion of the holder portion is covered by the covering member. In accordance with this structure, the transmitting element is accommodated in the accommodating portion of the holder portion formed by molding a resin on the base portion of the key body and the accommodating portion is covered by fitting into the covering member from the opening of the accommodating portion. In a state thus covered, the protector portion to cover the holder portion is formed with resin to form the grip portion. Accordingly, damage of the transmitting element due to the heat when the protector portion is formed can be prevented. If the covering member is integrally formed with the holder portion when the holder portion is molded, excess or deficiency of numbers of the covering member can be avoided and labor for counting numbers of the covering member can be eliminated. Further, if the transmitting element to be accommodated in the accommodating portion is disposed so as to be separated from the key body in a predetermined distance, electric waves transmitted from the transmitting element are not interrupted by the key body and are reliably transmitted.

BRIEF DESCRIPTION OF THE DRAWINGS

FIG. 29 is an exploded perspective view of a resin container according to a ninth embodiment of the present invention.

FIG. 30 is a perspective view of a key before molding according to a tenth embodiment of the present invention.

FIG. 32 is a front view of a key according to an eleventh embodiment of the present invention.

FIG. 33 is a cross-sectional view taken along the line 33—33 in FIG. 32.

EMBODIMENTS (First Embodiment)

A first embodiment corresponds to a structure according to claim 1.

Figure 1:
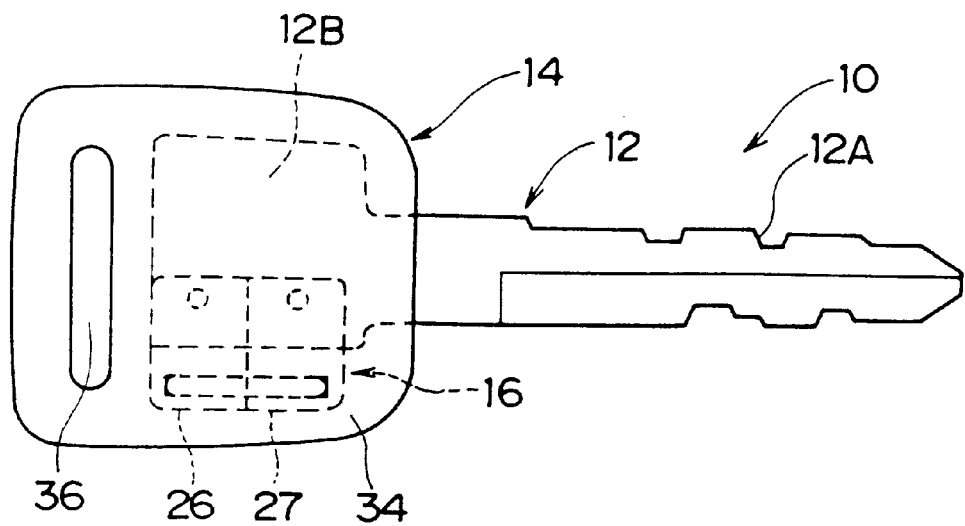
FIG. 1 is a front view of a key of a first embodiment according to the present invention.

As shown in FIG. 1, a key 10 according to the first embodiment of the present invention comprises a key body 12 and a key knob 14. The key body 12 is constituted by a flat metal plate which is used for insertion into a key cylinder 24 as a lock provided in a steering column 22 of a vehicle 20 shown in FIG. 7. Engaging projections and recesses portion is formed in the key cylinder 24 into which an insertion portion 12A is fitted.

Figure 2:
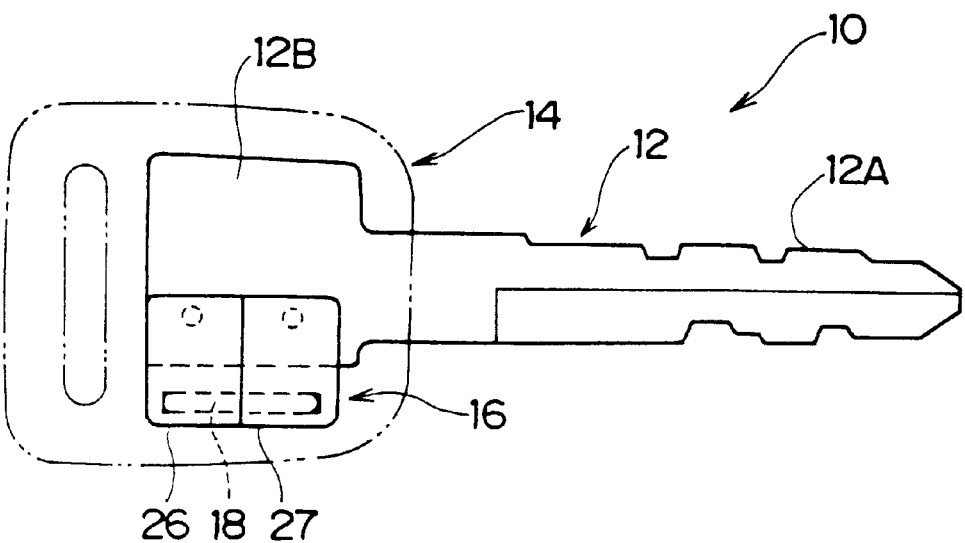
FIG. 2 is a plan view of a key body and a resin container which show a state before molding of a resin outer skin.
Figure 3:
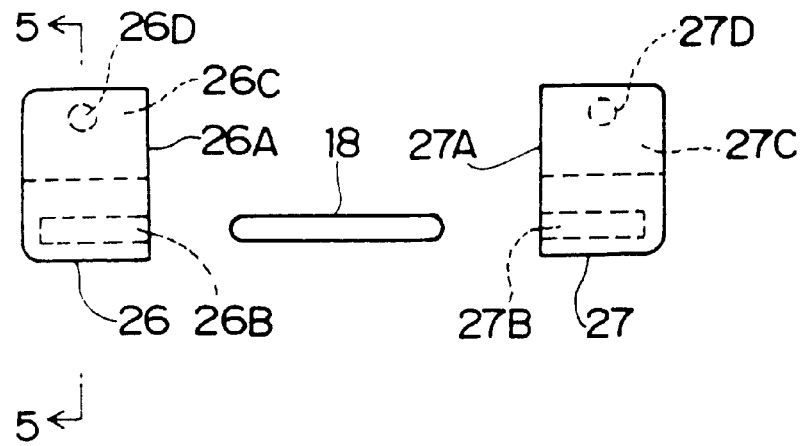
FIG. 3 is a plan view showing the resin container 16 and a transmitting element 18.
Figure 4:
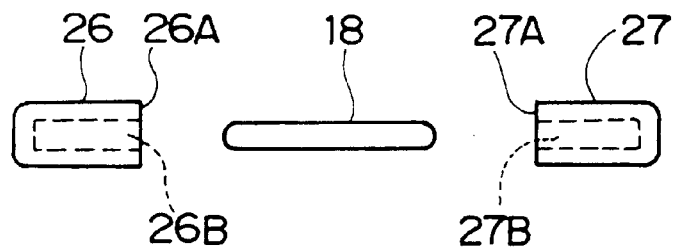
FIG. 4 is a bottom view of the resin container and the transmitting element of FIG. 3.

As shown in FIG. 2, a base portion 12B of the key body 12 within the key knob 14 is wider than the insertion portion 12A and a resin container 16 as a hard non-metal container is attached to the base portion 12B. The resin container 16 has a separable structure into two pieces, and is formed by container halves 26 and 27. The container half 26 and the other container half 27 are symmetrical one another as shown in FIGS. 3 and 4, and the side surfaces 26A and 27A thereof are fitted in each other when the container halves are mounted onto the key body 12. In addition, accommodation holes 26B and 27B in predetermined dimensions are formed from the side surfaces 26A and 27A, the accommodation holes 26B and 27B being cylindrical rod-shaped so as to accommodate each side of a transmitting element 18, respectively. A fitting means may be provided, or an adhesive may be applied between the surfaces 26A and 27A so that the side surfaces 26A and 27A contact tightly each other and a resin does not enter into the accommodation holes 26B and 27B when a soft resin outer skin 34 to be molded onto the outer periphery of the base portion 12B is molded.

U-shaped grooves 26C and 27C are formed from the sides of the container halves 26 and 27, respectively, and have functions to nip the key body 12 and to mount the container halves 26 and 27 onto the key body 12. These U-shaped grooves 26C and 27C have projections 26D and 27D at opposing surfaces therein, respectively, so that the container halves 26 and 27 mechanically engage with the key body 12 by fitting the projections 26D and 27D in the recesses 32 formed in the key body 12 (see FIG. 5).

Accordingly, a holding member for attaching the container half 26 and the other container half 27 to the key body 12 is constituted by the U-shaped grooves 26C and 27C, the projections 26D and 27D, and the recesses 32.

These container halves 26 and 27 are made from a hard, heat resistant and low thermal conductive resin which includes polyacetal resins and polyester resins such as polybutylenetelephthalate resin and the like.

A resin outer skin 34 such as soft polyvinylychloride resin and the like is molded on the outer periphery of the container halves 26 and 27. The resin outer skin 34 is made from a softer synthetic resin than the resin container 16. The key knob 14 exposed within the interior of a vehicle is constituted as soft one because of the softness of the resin outer skin 34. Further, the container halves 26 and 27 are made from materials and have dimensions which do not exert an adverse influence upon the transmitting element 18 by heat and pressure when the resin outer skin 34 is molded on the outer periphery of the resin container 16.

In addition, an opening 36 which is used for attaching a key holder and the like is provided in the resin container 16 and the resin outer skin 34.

Figure 7:
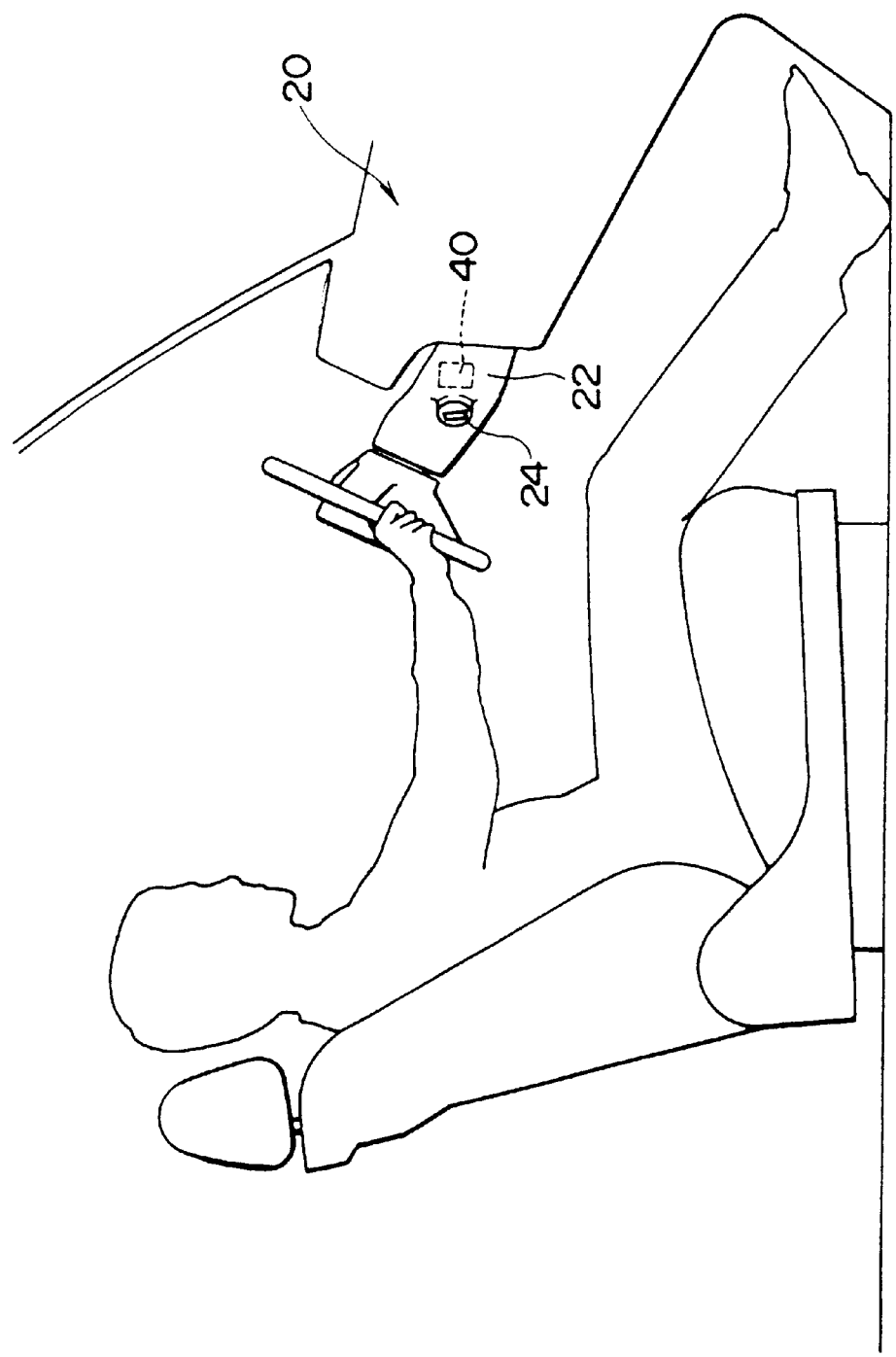
FIG. 7 is a side view of a vehicle showing a state in which a first embodiment is applied to the vehicle.
Figure 8:
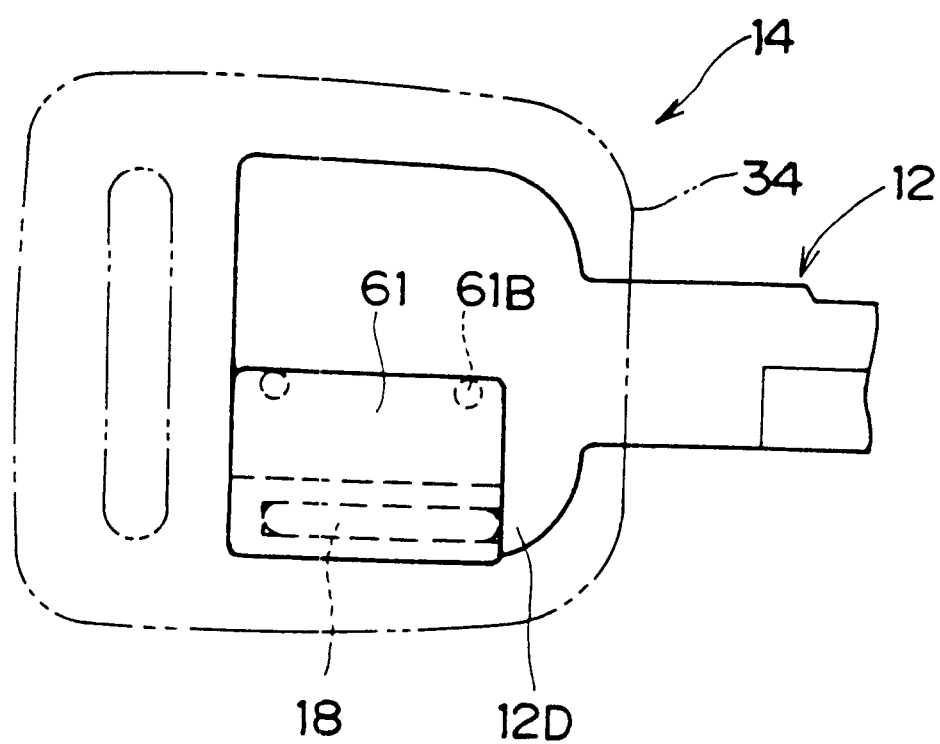
FIG. 8 is a front view of a key before molding according to a second embodiment.
Figure 9:
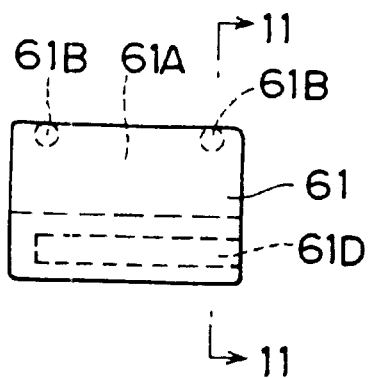
FIG. 9 is a front view of a resin container according to the second embodiment.
Figure 10:
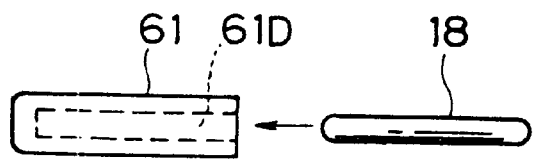
FIG. 10 is a bottom view of the resin container of FIG. 9 corresponding to a transmitting element.
Figure 11:
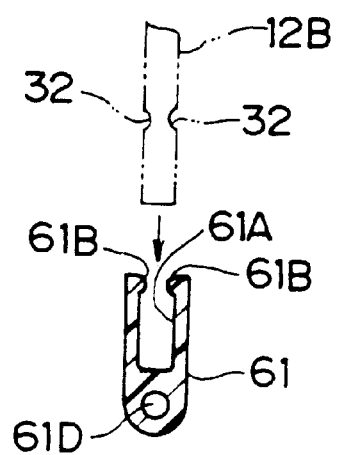
FIG. 11 is a cross-sectional view taken along the line 11—11 in FIG. 9.
Figure 12:
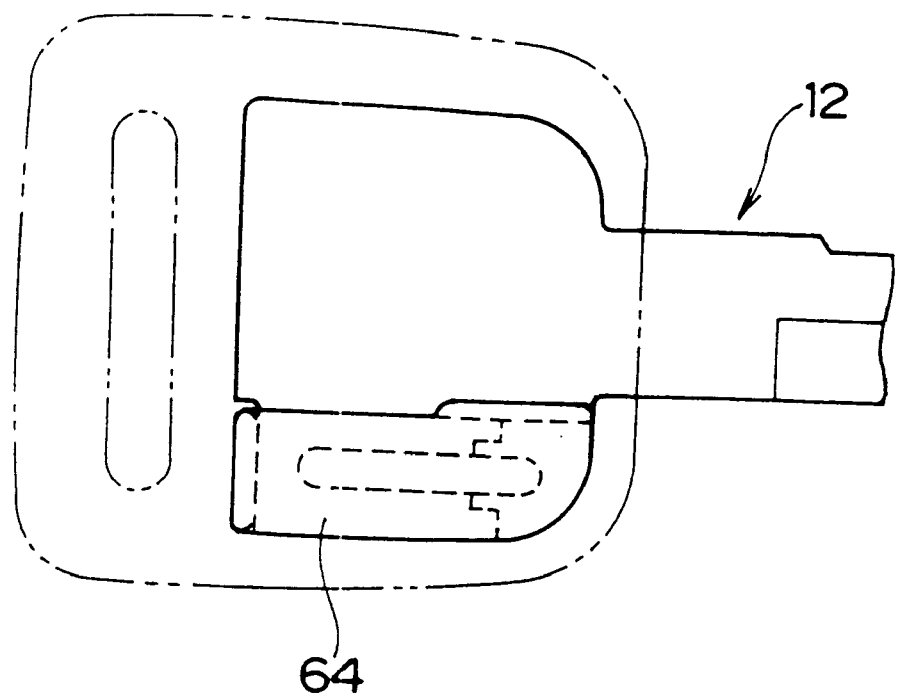
FIG. 12 is a front view of a key before molding according to a third embodiment.
Figure 13:
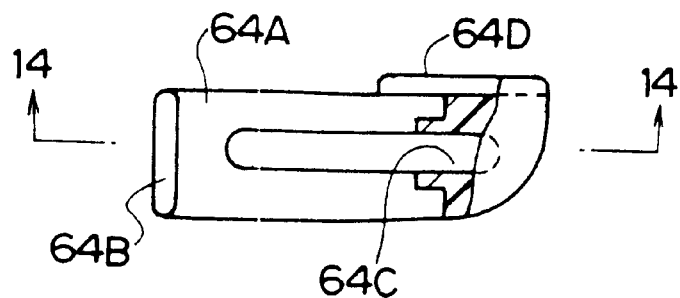
FIG. 13 is a partly broken-out front view of the resin container according to the third embodiment.
Figure 14:
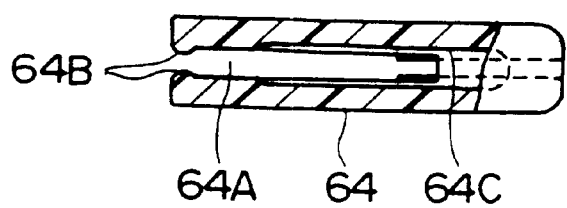
FIG. 14 is a cross-sectional view taken along the line 14—14 in FIG. 13.
Figure 15:
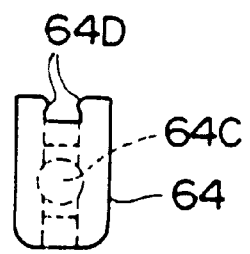
FIG. 15 is a side view of the resin container according to FIG. 13.
Figure 16:
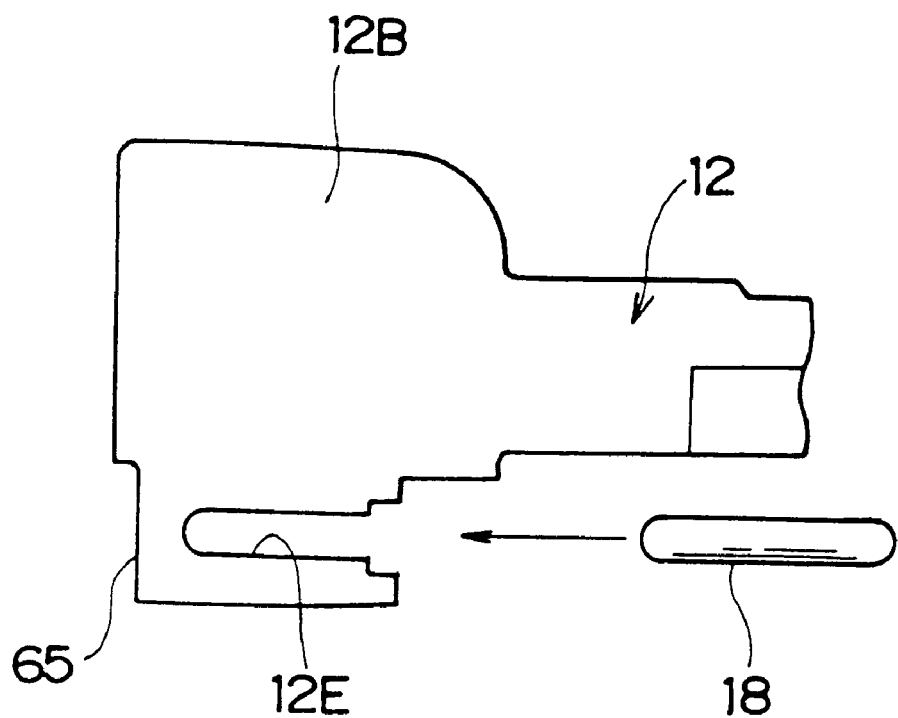
FIG. 16 is a front view of the key body according to the third embodiment.
Figure 17:
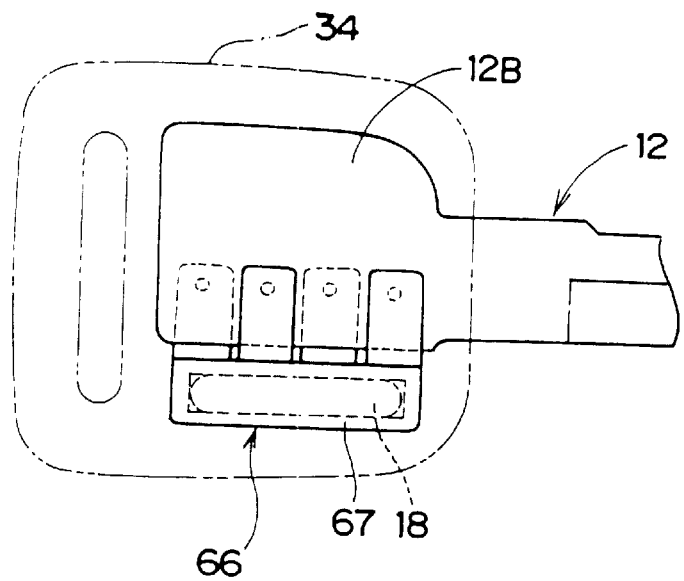
FIG. 17 is a front view of a key before molding according to a fourth embodiment of the present invention.
Figure 18:
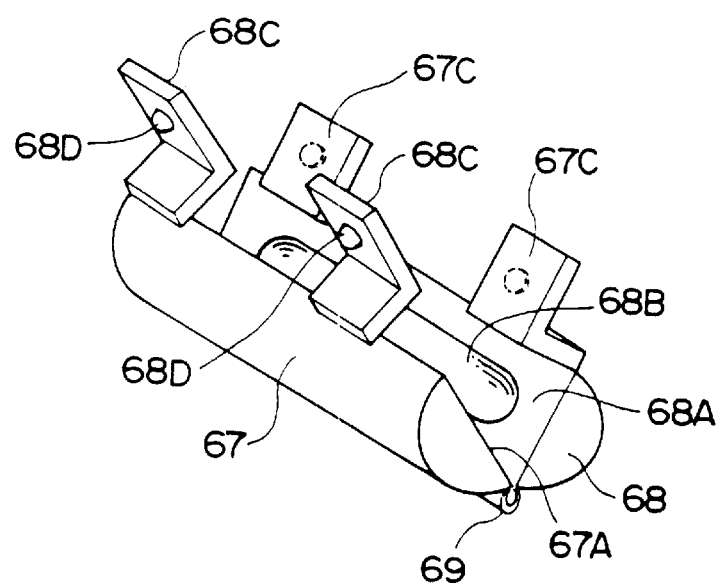
FIG. 18 is a perspective view of a resin container in an opened state according to the fourth embodiment.

As shown in FIG. 7, a control module 40 is mounted in the vicinity of the steering column 22. The control module 40 is preferably disposed inside the cover of the steering column 22 so that the control module 40 can not be visually looked from outside.

Figure 6:
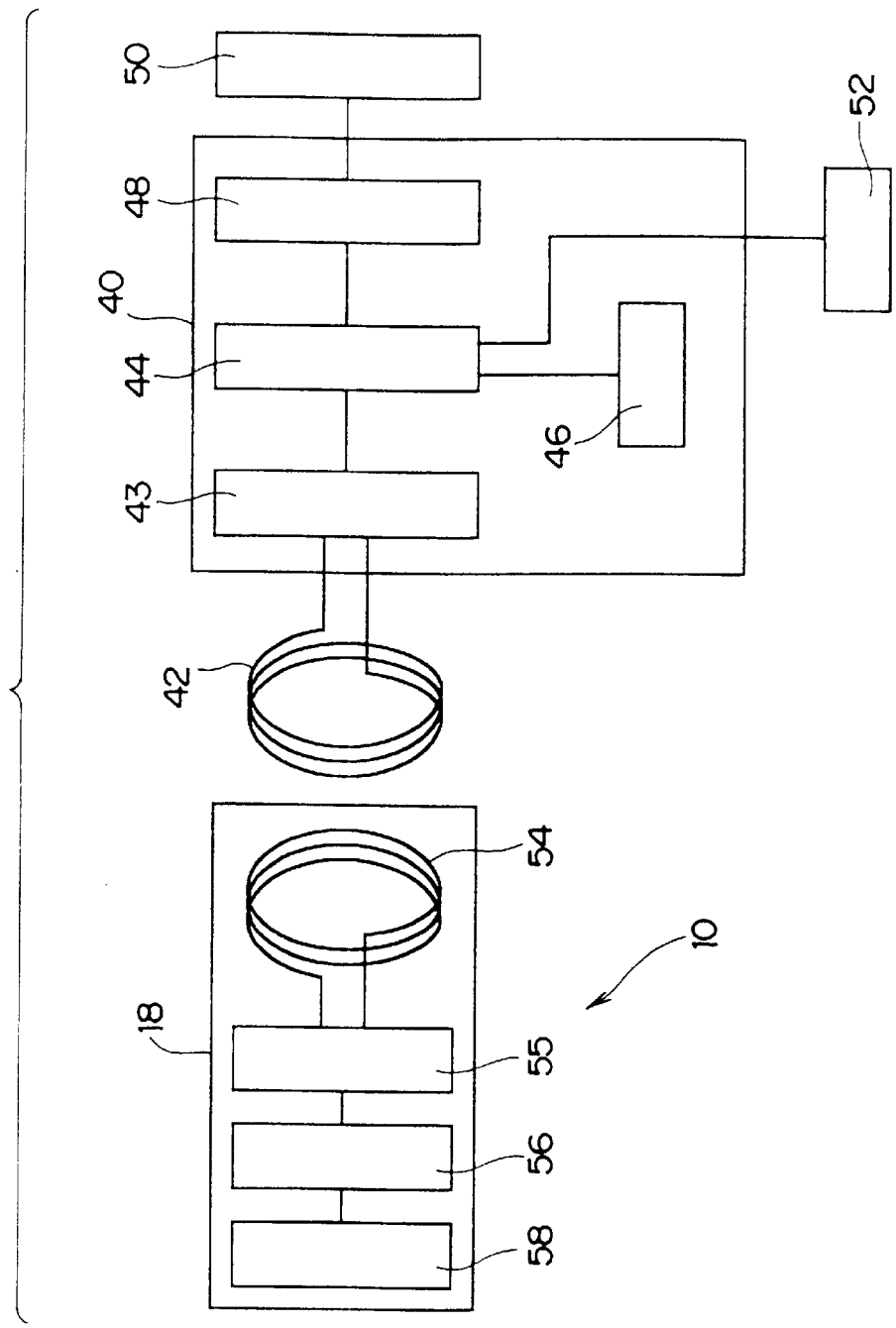
FIG. 6 is a block diagram showing the constitution of a control module and the transmitting element.

As shown in FIG. 6, in the control module 40, a transmitting and receiving coil 42, a transmitting and receiving circuit 43, a control circuit 44 and a memory 46 are connected each other, and the control circuit 44 is connected to a vehicle control circuit 50 via an interface circuit 48. Accordingly, when a vehicle engine is started or a receiving signal is generated in the transmitting and receiving coil 42, the control circuit 44 of the control module 40 transmits an actuation signal from the transmitting and receiving coil 42 to the transmitting element 18 of the key 10 via the transmitting and receiving circuit 43. An ID signal from the transmitting element 18 of the key 10 is received by the transmitting and receiving coil 42 and judged by the control circuit 44. A registration code writing device 52 is connected to the control circuit 44 so that an ID code can be written therein.

On the other hand, a transmitting and receiving coil 54, a transmitting and receiving circuit 55, a control circuit 56 and a memory 58 are provided in the transmitting element 18 and connected each other. Accordingly, an electromotive force is generated in the transmitting and receiving coil 54 in the transmitting element 18 by a current generated in the transmitting and receiving coil 42. The electromotive force actuates the control circuit 56 through the transmitting and receiving circuit 55 and the ID code stored in the memory 58 is transmitted from the transmitting and receiving coil 54 to the transmitting and receiving coil 42. A receiving signal from the transmitting and receiving coil 42 which has received the ID code is transmitted to the control circuit 44 through the transmitting and receiving circuit 43 so that the control circuit 44 collates the ID code thus received with the ID code stored in the memory 46. When the ID codes are coincide with one another through this collation, a signal is transmitted from the control circuit 44 to the vehicle control circuit 50 through the interface circuit 48 so that the vehicle engine can be started or continuously operated. In the case that the received ID code is different from the ID code stored in the memory 46, another signal is transmitted to the vehicle control circuit 50 to cause the engine to be impossible to start, or to stop the operation of the engine.

The transmitting and receiving circuit 55, the control circuit 56 and the memory 58 in the transmitting element 18 are constituted as a single IC. The external dimensions of the transmitting element 18 are, for example, 1 mm in diameter and 10 mm in length.

Next, the manufacturing procedures of this embodiment will be described hereinafter.

Figure 5:
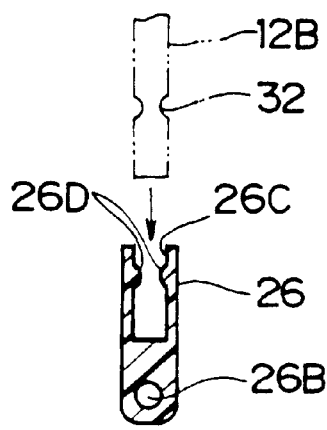
FIG. 5 is a cross-sectional view taken along the line 5—5 in FIG. 3.

The container halves 26 and 27 of the resin container 16 are separately molded and the transmitting element 18 is accommodated in the accommodation holes 26B and 27B. In this state, as shown in FIG. 5, the U-shaped grooves 26C and 27C are attached to the key body 12. When attaching the U-shaped grooves 26C and 27C to the key body 12, the projections 26D and 27D are inserted into the recesses 32 of the key body 12, and therefore, the resin container 16 is mechanically connected with the key body 12 in the state that the resin container 16 is holding the transmitting element 18. The side surfaces 26A and 27A are tightly fitted each other and the transmitting element 18 is mounted between the accommodation holes 26B and 27B in a sealed condition so that the soft resin outer skin 34 to be molded later is not enter therein.

Thereafter, the soft resin outer skin 34 is molded on the outer periphery of the key body 12 and the resin container 16. When molding, the key body 12 and the resin container 16 is inserted into a forming mold and an insert molding is carried out. The insert molding is carried out in such a manner that components made of metal or other materials to be embedded in a molded product after molding are placed within the forming mold in advance and are molded. When the resin outer skin 34 is molded, heat and pressure act on the resin container 16. However, the transmitting element 18 in the resin container 16 is protected by the resin container 16, and therefore, the transmitting element 18 is not subjected to adverse effects due to the heat and pressure.

Next, an operational procedure using the key 10 according to the present embodiment will be described hereinafter.

When the key 10 is rotated by holding the key knob 14, the inner cylinder of the key cylinder 24 into which the key 10 is inserted is rotated together with the key 10, and the starter is actuated by the vehicle control circuit 50 so that the vehicle engine is started.

At the same time, the transmitting and receiving circuit 43 of the control module 40 receives a signal announcing that the vehicle engine has started from the vehicle control circuit 50, and the control circuit 44 actuates the transmitting and receiving circuit 43 to pass a current to the transmitting and receiving coil 42. Accordingly, the transmitting element 18 of the key 10 disposed in the vicinity of the transmitting and receiving coil 42 causes an electromotive force in the transmitting and receiving element 54. The control circuit 56 is actuated by the electromotive force so that the ID code stored in the memory 58 is transmitted from the transmitting and receiving coil 54. The transmitted signal is received by the transmitting and receiving coil 42 and transmitted to the control circuit 44 through the transmitting and receiving circuit 43. The control circuit 44 transmits a signal to the vehicle control circuit 50 when the ID code received by the control circuit 44 is identical to the ID code stored in the memory 46 so that the vehicle control circuit 50 allows to continue to operate the vehicle engine. However, in the case that the received ID code is different from the stored ID code, or an ID code is not received, the control circuit 44 transmits a different signal to the vehicle control circuit 50 so that the vehicle control circuit 50 makes the engine stop.

Further, in the above-described embodiment, the key 10 transmits the ID code to the control module 40 after the vehicle engine has been started. However, the ID code may be transmitted when the key 10 is inserted into the key cylinder 24, and thereafter, the vehicle control circuit 50 may causes the engine start.

(Second Embodiment)

A second embodiment corresponds to a structure according to claim 2. In addition, the second embodiment through the seventeenth embodiment are described hereinafter, and descriptions in common with those of the first embodiment are omitted.

The second embodiment according to the present invention is illustrated in FIGS. 8 through 11.

In the second embodiment, a resin container 61 is made from a hard synthetic resin similar to that of above-described embodiment, but the size of the resin container 61 is equivalent to the totalized size of the container half 26 and the container half 27 above. The resin container 61 has a role as a hard non-metal covering member. The resin container 61 has a U-shaped groove 61A and a projection 61B, and an accommodation hole 61D as an accommodating portion is formed from a side surface 61C in the depth of accommodating the entire transmitting element 18. A step portion 12D is formed in the key body 12 to cover the entrance of the accommodation hole 61D in the state that the resin container 61 is mechanically attached to the key body 12. Consequently, the transmitting element 18 is built-in in the resin container 61 of this embodiment in a sealed condition as is in the above embodiment. However, in this embodiment, the sealed condition of the transmitting element 18 is maintained with the resin container 61 and base portion 12B. Accordingly, the heat and pressure for molding the resin outer skin 34 do not affect the transmitting element 18. In place of the step portion 12D, a cover or the like may be attached to the entrance of the accommodation hole 61D, or an adhesive may be applied to the entrance to close it.

(Third Embodiment)

A third embodiment corresponds to a structure according to claim 2.

The third embodiment according to the present invention is illustrated in FIGS. 12 through 16. In this embodiment, a hard resin container 64 is mounted on the key body 12 in the direction orthogonal to each of the resin containers in the above-described embodiments, i.e., in parallel with the longitudinal direction of the key insertion portion 12A (right and left directions in FIG. 12). A U-shaped groove 64A is formed in the mounting direction in the resin container 64, and projections 64B provided at the inside of the distal end portion of the U-shaped groove 64A clasp and fit the side surface 65 of the top end of the key body 12 in the insertion direction so that the resin container 64 is reliably secured to the key body 12.

A groove 12E in the key body 12 is provided corresponding to the bottom surface of the U-shaped groove 64A of the resin container 64 attached to the key body 12 so that one side of the transmitting element 18 in the axial direction is accommodated in the groove 12E. In addition, an accommodation hole 64C is formed from the bottom of the U-shaped groove 64A of the resin container 64 corresponding to the groove 12E so that the other side of the transmitting element 18 can be accommodated in the accommodation hole 64C. Accordingly, the resin container 64 is attached to the key body 12 in the arrow direction in FIG. 16, after the transmitting element 18 has been accommodated in the U-shaped groove 64A and the accommodation hole 64C, and in the state shown in FIG. 12, the transmitting element 18 is accommodated in the groove 12E, the U-shaped groove 64A of the resin container 64 and the accommodation hole 64C which constitute an accommodating portion. That is, the transmitting element 18 is accommodated in a sealed condition with the resin container 64 and the key body 12.

Further, a pair of opposing projecting pieces 64D for nipping and holding the key body base portion 12B is provided at a part of the resin container 64. After the above-described process, the soft resin outer skin 34 is molded on the resin container 64 and the key body 12 in the similar manner to the above embodiments.

(Fourth Embodiment)

A fourth embodiment corresponds to a structure according to claim 1.

Figure 19:
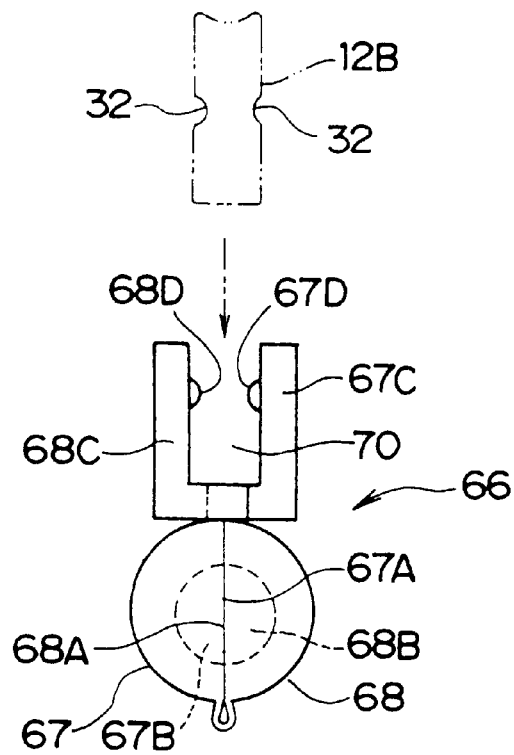
FIG. 19 is a side view of the resin container in a closed state.
Figure 20:
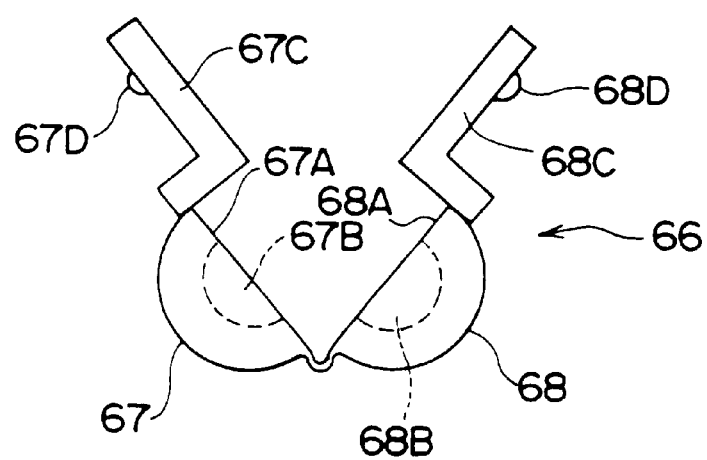
FIG. 20 is an operational drawing showing an opened state of the resin container according to FIG. 19.

The fourth embodiment according to the present invention is shown in FIGS. 17 through 20. In the resin container 66 in this embodiment, a container half 67 and the other container half 68 are connected each other with an integral hinge 69 so as to be capable of swingably opening and closing the container halves 67 and 68. In the closed state as shown in FIG. 19, each of the container half 67 and the container half 68 is semi-circular rod-shaped to form a cylindrical rod shape. As shown in FIG. 20, in the opened state, semi-circular accommodation holes 67B and 68B on contact surfaces 67A and 68A are exposed to form an accommodating space for the transmitting element 18. In the state shown in FIG. 19 where the container halves 67 and 68 are exactly fitted each other by deforming the hinge 69 and the contact surfaces 67A and 68A are contacted each other, the transmitting element 18 is accommodated in the accommodation holes 67B and 68B in a sealed condition. To ensure the sealed condition, an adhesive or other resin and the like may be applied on these contact surfaces.

Further, arms 67C and 68C project from the sides opposite to the integral hinge 69 of the container halves 67 and 68 in the direction apart from the integral hinge 69, and the directions extended from the arms 67C and 68C intersect each other when viewed from the axial direction of the transmitting element 18 to be accommodated as shown in FIG. 20. Accordingly, in the closed state, a U-shaped groove 70 is formed between the arms 67C and 68C. After the key body 12 has been inserted into the U-shaped groove 70, the container halves 67 and 68 become impossible to be opened. Protrusions 67D and 68 projecting from the surfaces opposing each other in the U-shaped groove 70 are inserted into the recesses 32 formed in the key body 12 in the similar manner to the above-described embodiments. Further, a soft resin outer skin 34 is molded on the key body 12 and the resin container 66 in the similar manner to the above embodiments.

(Fifth Embodiment)

A fifth embodiment corresponds to a structure according to claim 1.

Figure 21:
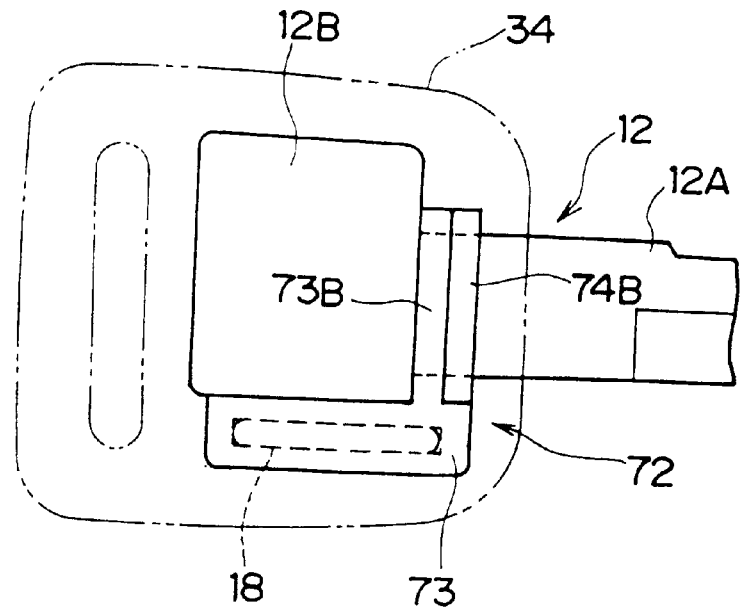
FIG. 21 is a front view of a key before molding according to a fifth embodiment of the present invention.
Figure 22:
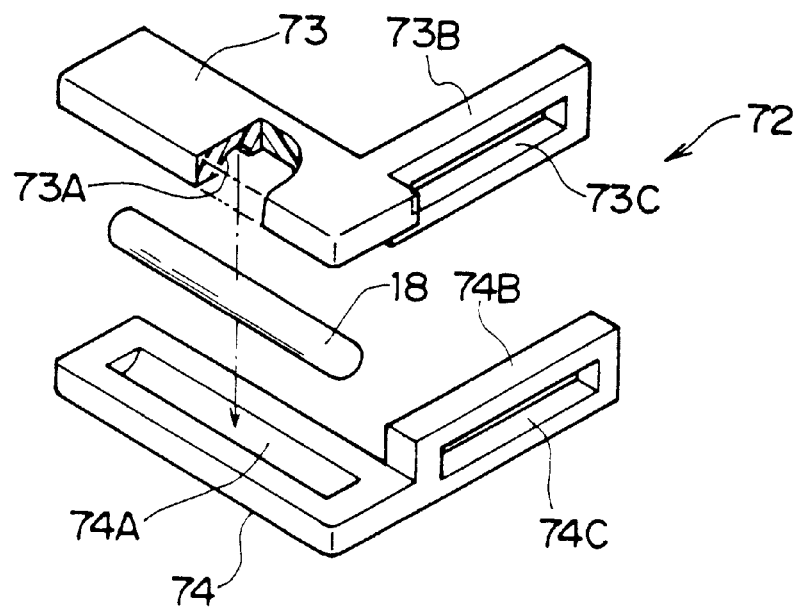
FIG. 22 is an exploded perspective view of a resin container according to the fifth embodiment.

The fifth embodiment according to the present invention is illustrated in FIGS. 21 and 22.

A hard resin container 72 used in this embodiment has a structure separable into two pieces which are container halves 73 and 74. Semi-circular cylindrical shaped accommodation holes 73A and 74A are formed on the opposing surfaces of the container halves 73 and 74, respectively. The transmitting element 18 is sealed in a hole formed in the state that the holes 73A and 74A are put together.

Arms 73B and 74B project from the container half 73 and 74, and the arms 73B and 74B as holding members have through holes 73C and 74C, respectively, which conform with each other in the state that the container halves 73 and 74 are fitted together. The key body 12 or the insertion portion 12A projecting from the key body 12 pass through the through holes 73C and 74C so that the resin container 72 is fixed to the key body 12 in a connected condition. This embodiment is the same as the above embodiments in that the resin outer skin 34 is molded on the key body 12 and the resin container 72.

(Sixth Embodiment)

A sixth embodiment corresponds to a structure according to claim 1.

Figure 23:
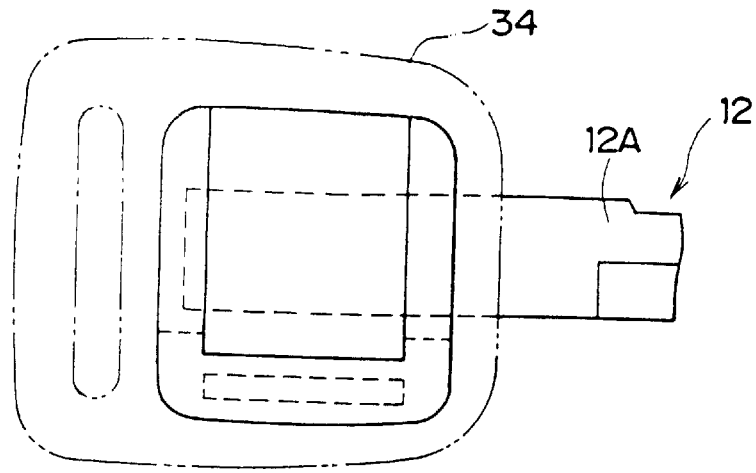
FIG. 23 is a front view of a key before molding according to a sixth embodiment of the present invention.
Figure 24:
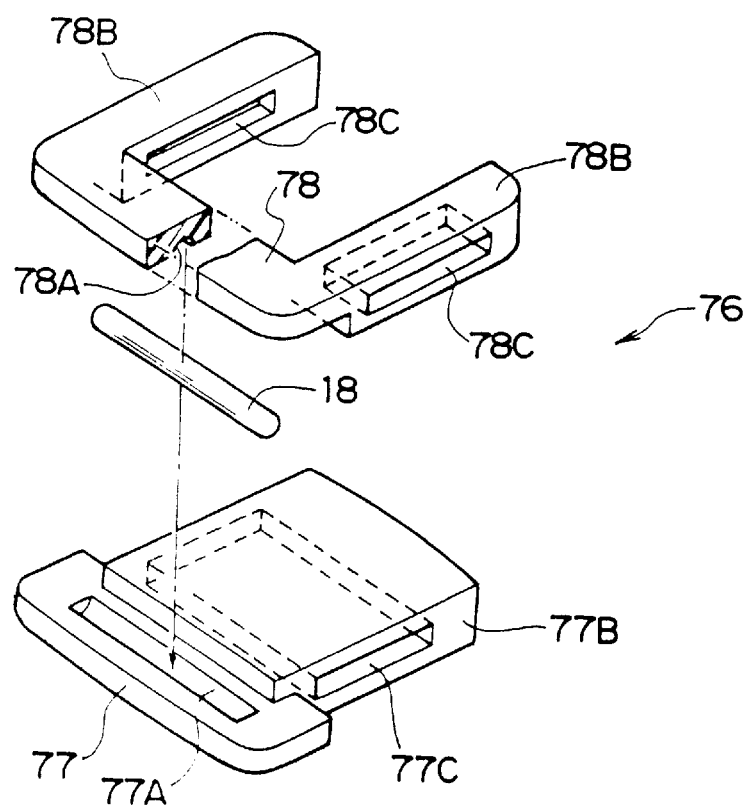
FIG. 24 is an exploded perspective view of a resin container according to the sixth embodiment.

The sixth embodiment of the present invention is shown in FIGS. 23 and 24. In this embodiment, a resin container 76 to be separated has container halves 77 and 78. A semicircular cylindrical shaped accommodation hole 77A, into which one half of the transmitting element 18 is inserted, is formed in the container half 77, and arm 77B projects from the container half 77. A through hole 77C is formed in the arm 77B in parallel with the longitudinal direction of the accommodation hole 77A so that the key body 12 or the insertion portion 12A projecting from the key body 12 is inserted into the through hole 77C. Further, an accommodation hole 78A, into which the other half of the transmitting element 18 is accommodated, is formed in the container half 78 in the state that the container half 78 contacts the container half 77 and a pair of arms 78B is projected from the both longitudinal ends of the container half 78. A through hole 78C is formed in each of the arms 78B and communicates with the through hole 77C in the state that the arms 78B are fixed to the container half 77.

Accordingly, in this embodiment, the transmitting element 18 is accommodated in the accommodation holes 77A and 78B, and the container half 77 and the container half 78 are contacted so as to conform to each respective periphery of the accommodation holes 77A and 78A so that a pair of the arms 78B abuts against the both sides of the arm 77B and the through holes 77C and 78C are communicated each other, and the key body 12 can be inserted therein. Consequently, when the insertion portion 12A is inserted into the through holes 77C and 78C, the resin container 76 maintains its connected condition as shown in FIG. 23, and similar effects as those of the above embodiments can be obtained by molding the resin outer skin 34 on the outer periphery of the resin container 34.

(Seventh Embodiment)

A seventh embodiment corresponds to a structure according to claim 1.

Figure 25:
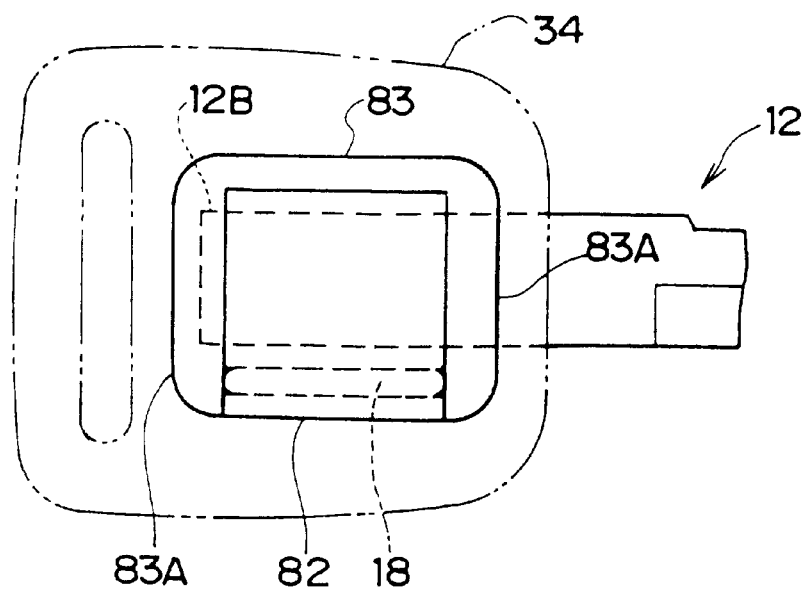
FIG. 25 is a front view of a key before molding according to a seventh embodiment of the present invention.
Figure 26:
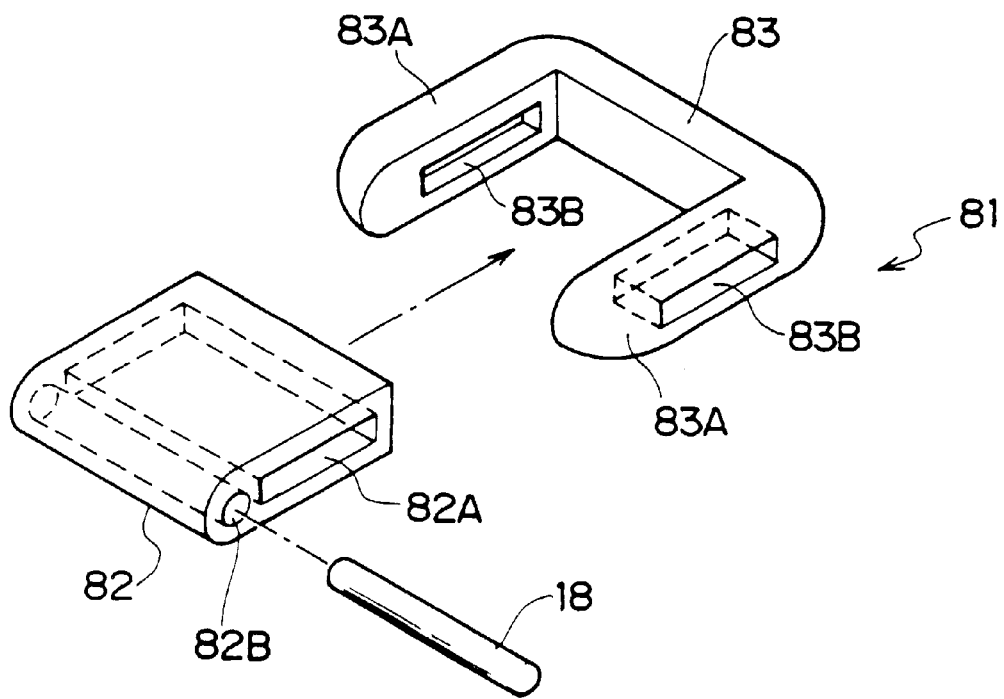
FIG. 26 is an exploded perspective view of the key according to the seventh embodiment.

The seventh embodiment of the present invention is shown in FIGS. 25 and 26. In this embodiment, a resin container 81 includes container halves 82 and 83 as those similar to those in the above embodiment. The container half 82 has a through hole 82A, similar to that in FIG. 24, into which key body 12 is inserted. However, an accommodation hole 82B for accommodating the transmitting element 18 is a circular through hole passing through the container half 82 in parallel with the through hole 82A. A pair of arms 83A project perpendicularly from the both longitudinal ends of the container half 83 and contact the both side surface of the container half 82. A through hole 83B is formed in each of the arms 83A and the container halves 82 and 83 are connected one another so that the arms 83A are fitted to the both sides of the container half 82 and the through holes 83B communicate with the through hole 82A to form a insertion hole for the key body 12 as shown in FIG. 25.

Accordingly, in the state that the transmitting element 18 is inserted into the accommodation hole 82B, the arms 83A of the container half 83 are contacted the both sides of the container half 82 so that the both ends of the accommodation hole 82B are closed by the arms 83A. When the key body 12 is inserted into the through holes 82A and 83B thus communicated with one another, the connected condition of the container halves 82 and 83 are maintained and the transmitting element 18 becomes in a sealed condition. Consequently, effects similar to those in the above-described embodiments can be achieved by molding the resin outer skin 34 on the outer periphery of the resin container 34.

(Eighth Embodiment)

A eighth embodiment corresponds to a structure according to claim 1.

Figure 27:
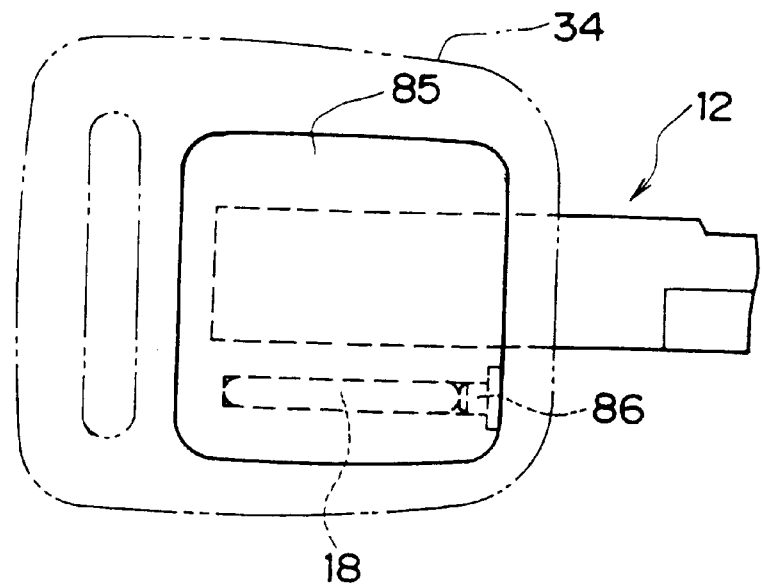
FIG. 27 is a front view of a key before molding according to a eighth embodiment of the present invention.
Figure 28:
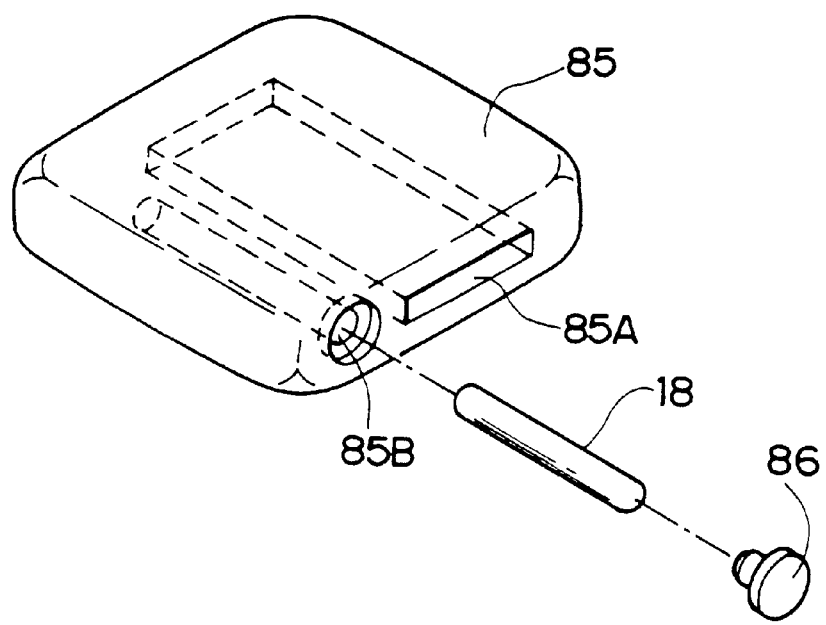
FIG. 28 is an exploded perspective view of a resin container according to the eighth embodiment.

The eighth embodiment of the present invention is shown in FIGS. 27 and 28. In this embodiment, a container 85 having a shape similar to the container half 82 in the above embodiment. An insertion hole 85A corresponding to the through hole in the container half 82 and an accommodation hole 85B are provided in the resin container 85, the insertion hole 85A and the accommodation hole 85B being holes with a bottom, respectively. After the transmitting element 18 has been inserted into the accommodation hole 85B, the entrance thereof is closed by a cover 86 so that the transmitting element is sealed.

After the key body 12 has been inserted into the insertion hole 85A of the resin container 85, the resin outer skin 34 is integrally molded on the periphery of the container 85 as shown in FIG. 27, so that the similar effects to those of each of the above embodiments can be achieved.

(Ninth Embodiment)

A ninth embodiment corresponds to a structure according to claim 1.

The ninth embodiment of the present invention is shown in FIG. 29. In this embodiment, an insertion hole 88A is provided in a resin container 88 having an external shape similar to those of the above embodiments. The cross-section perpendicular to the longitudinal direction of an accommodation hole 88B into which one half of the transmitting element 18 is inserted is semi-circular groove shaped so as to insert the transmitting element 18 by moving the element 18 in the direction perpendicular to the longitudinal direction of the element 18. Guiding grooves 88C are provided in the vicinity of the entrance of the semi-circular groove for sliding a cover plate 89 in the longitudinal direction of the accommodation hole 88B. The cover plate 89 is made from the same material as that of the resin container 88 and one end thereof is bent substantially at a right angle to form a stopper 89A so that an insertion quantity of the cover plate 89 into the guiding grooves 88C is restricted and the longitudinal end portion of the accommodation hole 88B is closed by the stopper 89A. A semi-circular groove 89B for accommodating the other half of the transmitting element 18 is formed in the reverse surface of the cover plate 89. Accordingly, after the transmitting element 18 has been inserted into the accommodation hole 88B, the accommodation hole 88B is closed by sliding the cover plate 89 into the guiding grooves 88C so that the transmitting element 18 is maintained in a sealed condition.

The key body 12 is inserted into the insertion hole 88A of the resin container 88 and the resin outer skin 34 is integrally molded on the outer periphery thereof in a similar manner to the above embodiments so that similar effects to those of the above embodiments can be obtained.

(Tenth Embodiment)

A tenth embodiment corresponds to a structure according to claim 1.

Figure 31:
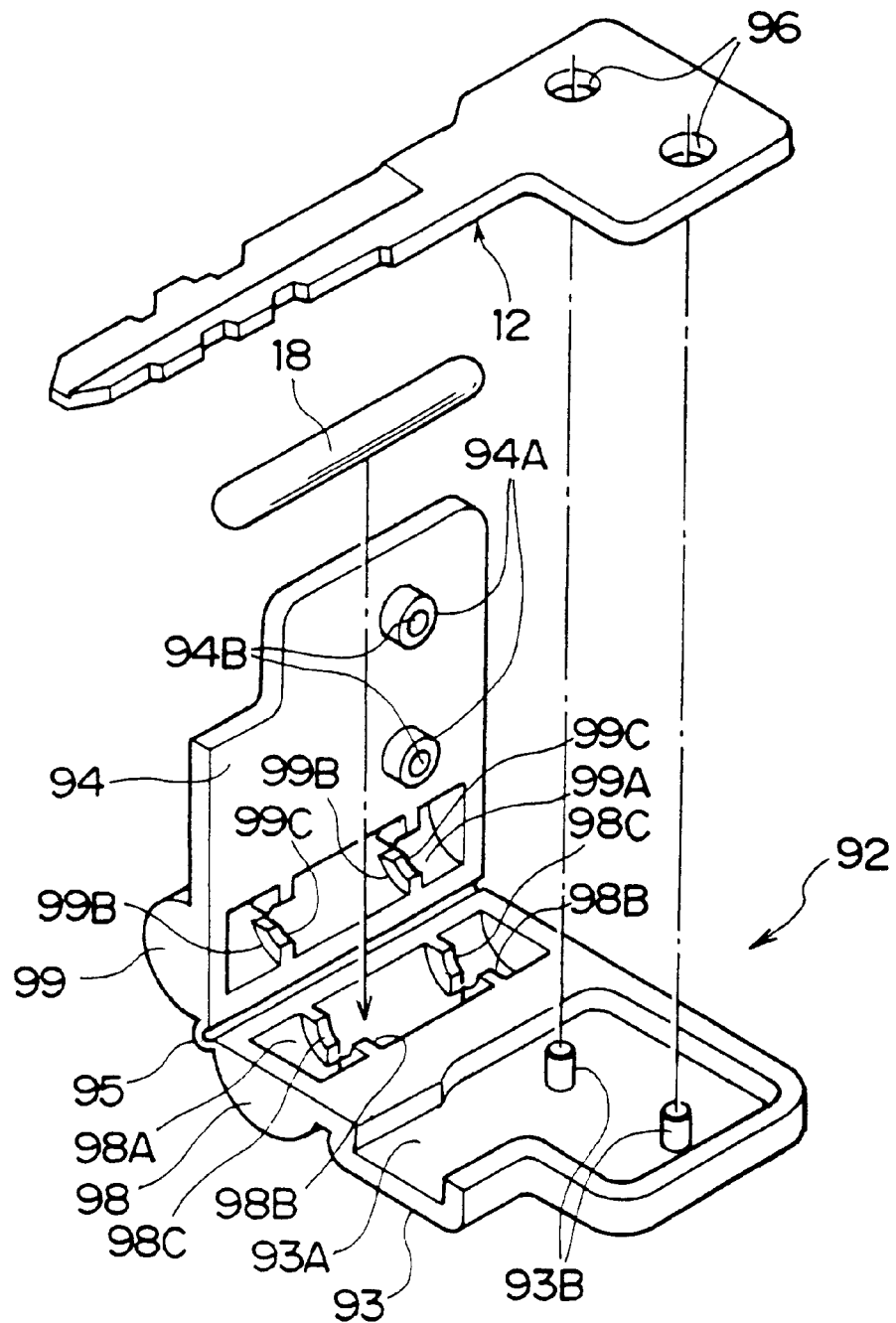
FIG. 31 is a perspective view of a resin container and the key body in an opened state according to the tenth embodiment.
Figure 34:
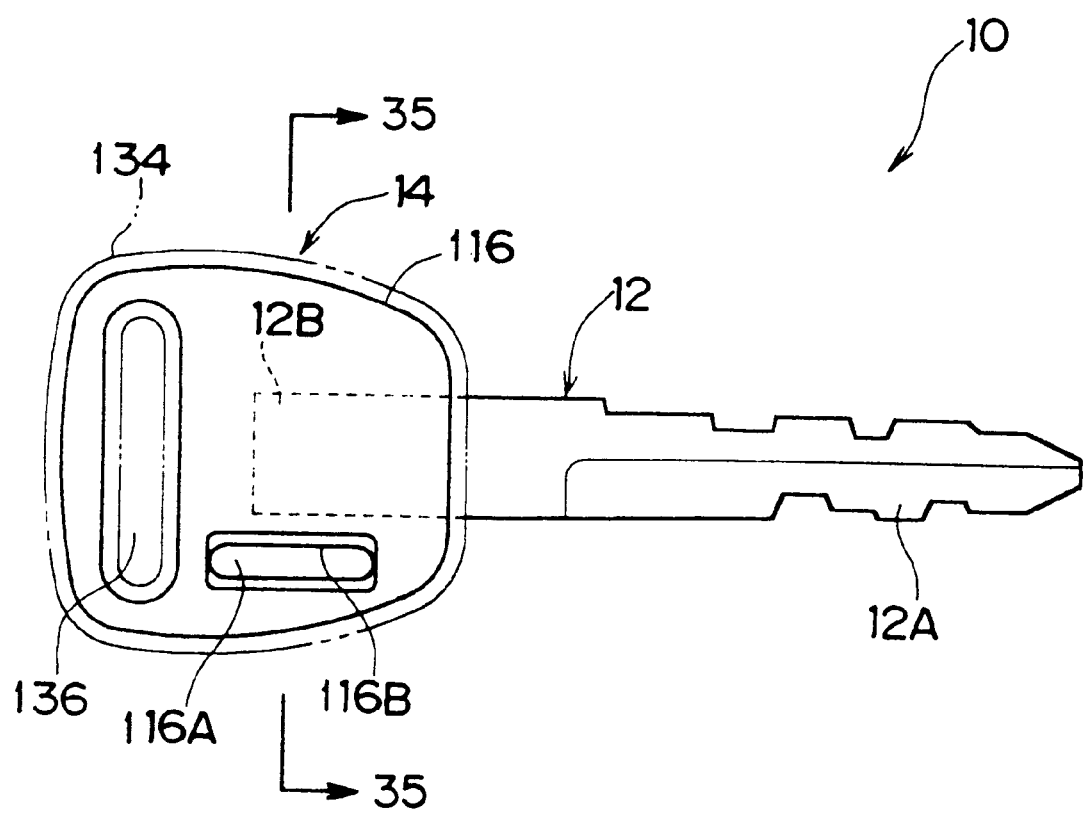
FIG. 34 is a front view of the key before a resin outer skin is molded.
Figure 35:
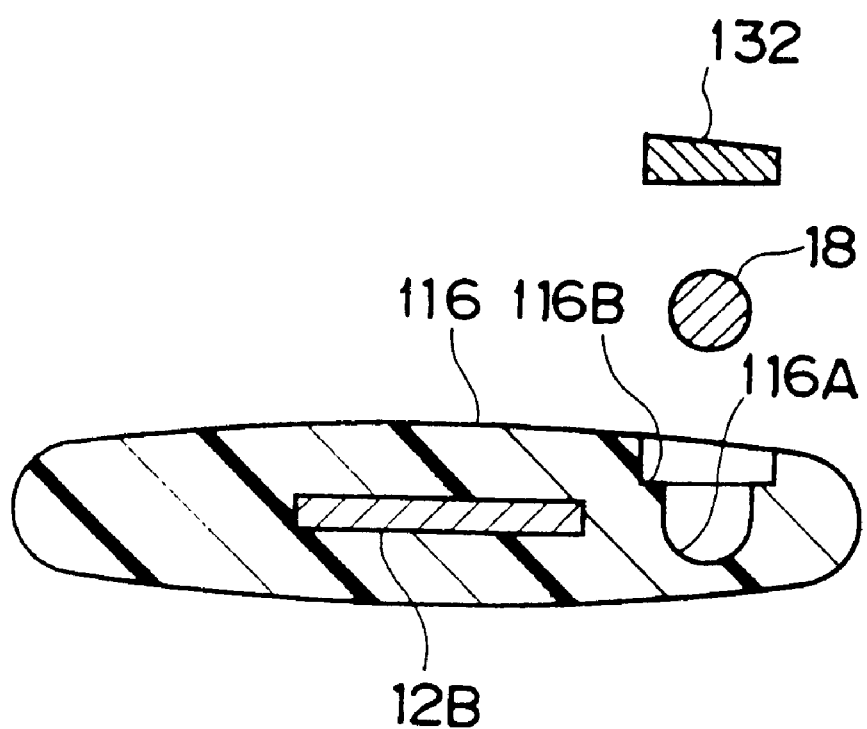
FIG. 35 is a cross-sectional view taken along the line 35—35 in FIG. 34.
Figure 36:
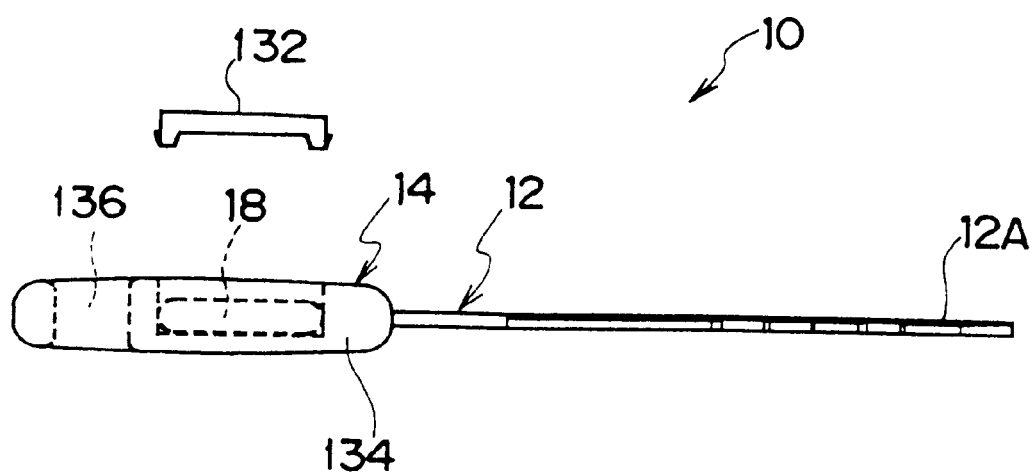
FIG. 36 is a bottom view of the key in a disassembled state in FIG. 34.

The tenth embodiment of the present invention is shown in FIGS. 30 and 31. A resin container 92 used in this embodiment has container halves 93 and 94 which can be opened and closed one another by a hinge 95 integrally formed with the container halves 93 and 94. An insertion groove 93A for inserting the key body 12 is formed in the container half 93, and the container half 94 is tightly contacted with the container half 93 while the integral hinge 95 is being deformed by the container half 94 in the state that the key body 12A is accommodated in the insertion groove 93A so that the key body 12 can be held as shown in FIG. 30. A pair of projections 94A projected from the container half 94 is accommodated into a pair of circular holes 96 so that the key body can be reliably held. Pins 93B projected from the container half 93 are inserted into insertion holes 94B formed in the projections 94A for exact positioning of the key body 12, and the container halves 93 and 94 are held in the closed state. For this purpose, the pins 93B may be force-fitted into the insertion holes 94B. Semi-circular bulge portions 98 and 99 are provided in the vicinity of the integral hinge 95 in the container halves 93 and 94, respectively. Semi-circular cylindrical concave portions 98A and 99A are formed in the interior of the semi-circular bulge portions, respectively. Ribs 98B and 99B are projected from the intermediate portions in the longitudinal directions of the concave portions. The transmitting element 18 is inserted into and held by notches 98C and 99C formed in the ribs 98B and 99B by force-fitting or the like. Accordingly, in the state that the transmitting element 18 is inserted into the notches 98C and 99C, when the container halves 93 and 94 are closed, the transmitting element 18 is secured to the resin container 92 in the sealed condition. Accordingly, as shown in FIG. 30, a key is completed by molding the soft resin outer skin 34 on the outer periphery of the resin container 92, and at the same time, the transmitting element 18 can be protected from the heat and pressure during molding.

(Eleventh Embodiment)

A eleventh embodiment corresponds to a structure according to claims 3 and 4.

The eleventh embodiment of the present invention is shown in FIGS. 32 through 36. As shown in FIGS. 32 through 36, a key knob 14 is formed by integrally molding a resin container 116 on the periphery of the base portion 12B and a recess 116A as an accommodation portion is provided in parallel with the base portion 12B. The transmitting element 18 is inserted into the recess 116A, and a step portion 116B provided at the entrance of the recess 116A is covered by a cover plate 132 as a cover member. In addition, the size of the cover plate 132 is preferably such that the transmitting element 18 accommodated in the recess 116A is lightly pressed by the cover plate 132 so as not to be moved in the recess 116A. The resin container 116 and the cover plate 132 are constituted by a hard thermal resistant and low thermal conductive resin such as polyacetal resins and polyester resins and the like including polybutylenetelephthalate resin and the like, and the base portion 12B is preferably insert-molded in the resin container 116. A resin outer skin 134 such as soft polyvinylchloride and the like is molded on the outer periphery of the resin container 116 and the cover plate 132. The resin outer skin 134 is made from softer synthetic resin than that of the resin container 116 so that the key knob 14 exposed in the interior of the vehicle becomes soft owing to the softness of the resin outer skin 134. Further, the material and the size of the resin container 116 and the cover plate 132 do not exercise adverse effects over transmitting element 18 due to the heat and pressure while the resin outer skin 134 is molded on the periphery of the resin container 116.

In the key body 12 of this embodiment, the base portion 12B thereof is insert-molded in the state that the base portion 12B is inserted into the resin container 116. The recess 116A is formed in the resin container 116 during molding, or after molding by cutting or the like, and the transmitting element 18 is inserted into the recess 116A. The recess 116A is covered by the cover plate 132 which may be force-fitted or may be fixed with an adhesive, as occasion demands. The soft resin outer skin 134 is molded on the outside of the resin container 116 and the cover plate 132. When the resin outer skin 134 is molded, heat and pressure arise. However, the transmitting element 18 is protected by the resin outer skin 116 and the cover plate 116 so that the transmitting element 18 endures the heat and pressure. Further, the thickness of the resin container 116 is such that the heat during molding cannot practically be conducted to the transmitting element 18, and the material of the resin outer skin 134 itself is not deformable by the heat during molding. When the insertion portion 12A of the key 10 is inserted into the key cylinder 24, the resin outer skin 134, which is soft, of the key knob 14 is exposed in the interior of the vehicle so that the hard part of the key 10 is not exposed in the interior of the vehicle.

(Twelfth Embodiment)

A twelfth embodiment corresponds to a structure according to claims 3 and 4.

Figure 37:
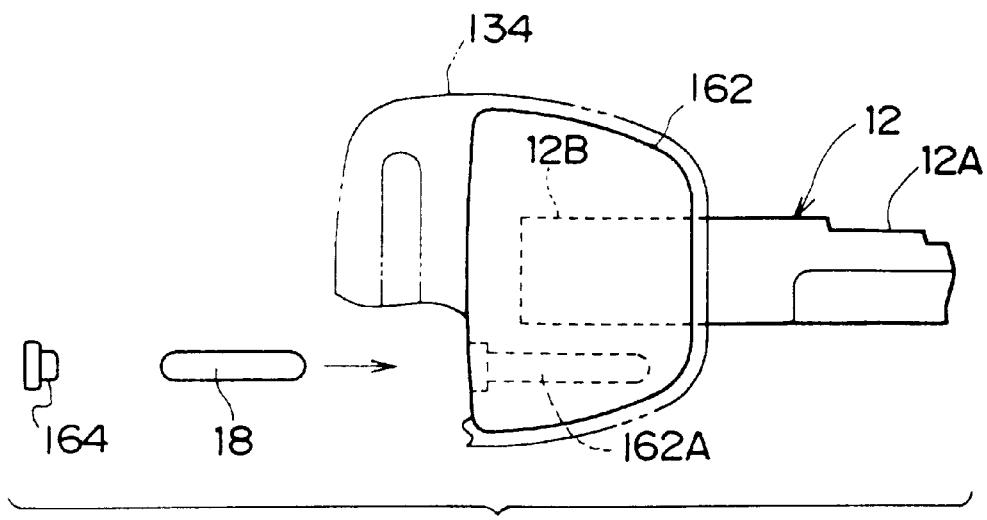
FIG. 37 is a front view of a key in a disassembled state according to a twelfth embodiment.

A key according to the twelfth embodiment of the present invention is illustrated in FIG. 37.

In this embodiment, a cylindrical recess portion 162A as an accommodation portion is formed in a hard resin container 162 into which the key base portion 12B is insert-molded in parallel with the longitudinal direction of the key body 12. After the transmitting element 18 has been inserted into the recess 162A in the axial direction, a cover 162 as a cover member is force-fitted or adhered into the entrance of the recess 162A so that the recess 162 is closed. The resin outer skin 34 is formed on the outer periphery of the resin container 162 and the cover 164 in a similar manner to the above-described eleventh embodiment.

(Thirteenth Embodiment)

A thirteenth embodiment corresponds to a structure according to claims 3 and 4.

Figure 38:
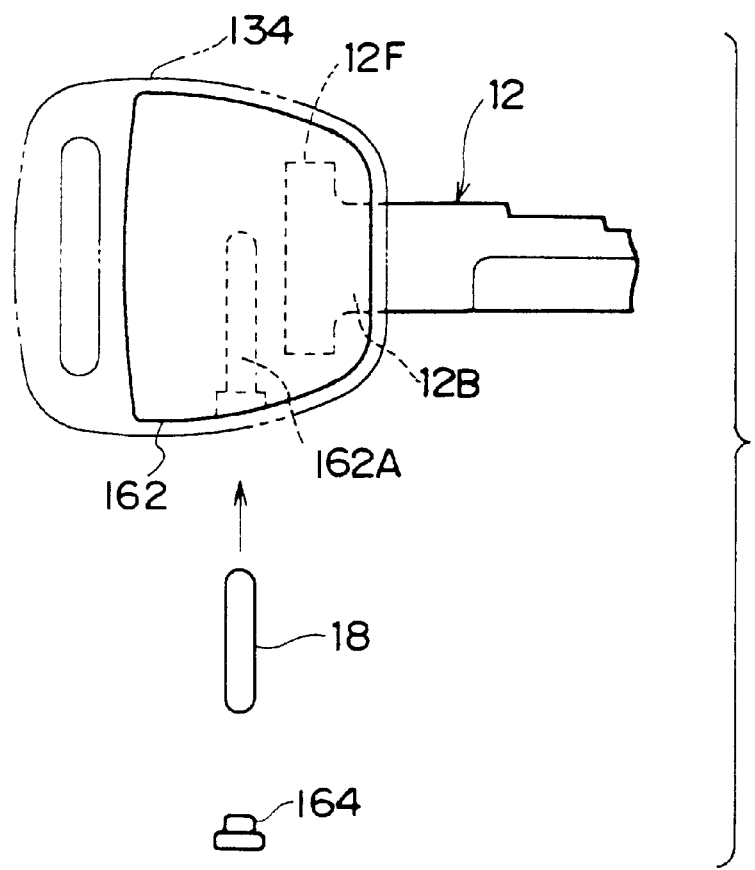
FIG. 38 is a front view of a key in a disassembled state according to a thirteenth embodiment.

The thirteenth embodiment is illustrated in FIG. 38.

In this embodiment, the longitudinal direction of the recess 162A is perpendicular to the longitudinal direction of the key body 12, while in the above embodiment, the longitudinal direction of the recess 162A is parallel to the longitudinal direction of the key body 12. In this embodiment, the amount of the base portion 12B of the key body 12 to be embedded in the resin container 162 is less so that an enlarged portion 12F is formed at the distal end portion of the base portion 12B and the key body 12 is prevented from coming off out of the resin container 162.

(Fourteenth Embodiment)

A fourteenth embodiment corresponds to a structure according to claims 3 and 5.

Figure 39:
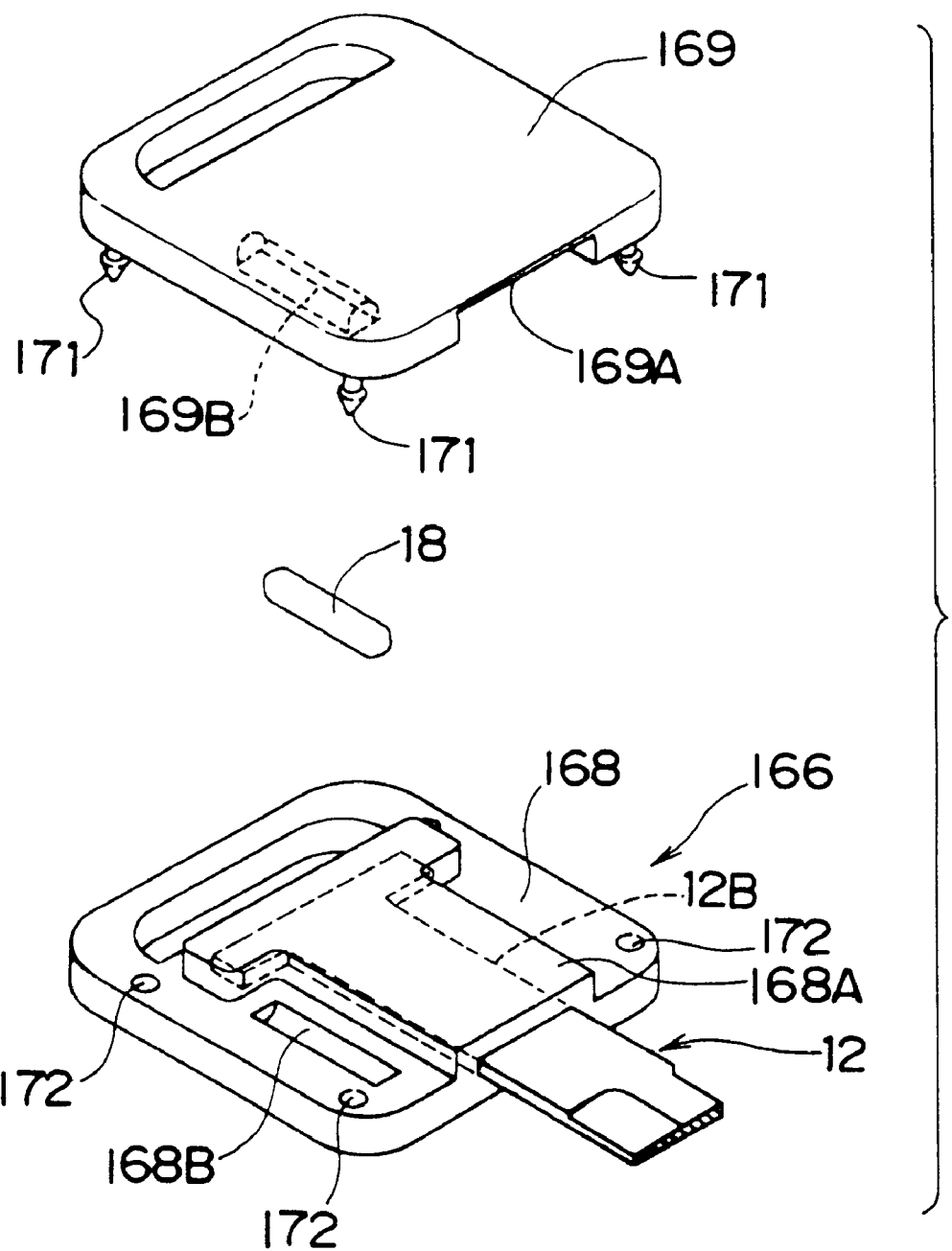
FIG. 39 is an exploded perspective view of an insertion portion of a resin container and the resin container in a separated condition according to a fourteenth embodiment.
Figure 40:
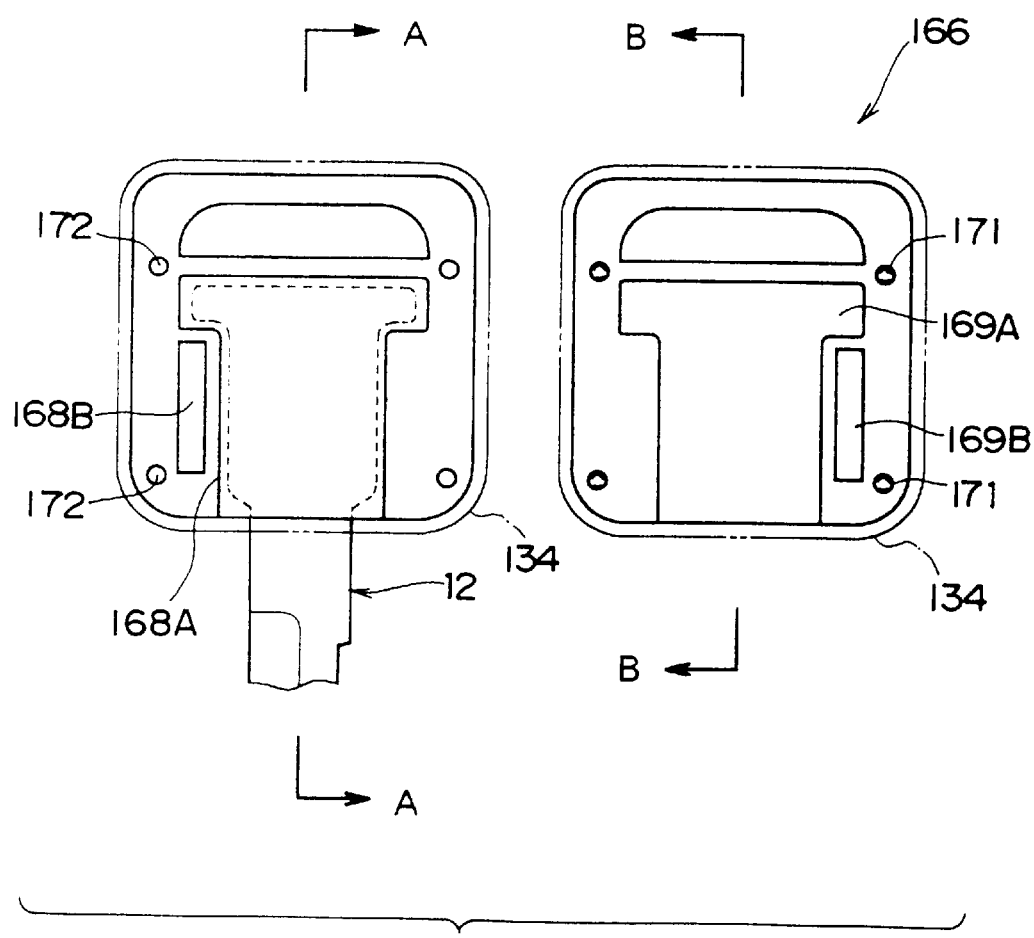
FIG. 40 is an exploded plan view showing the relationship between the resin container and the key body in FIG. 39.
Figure 41:
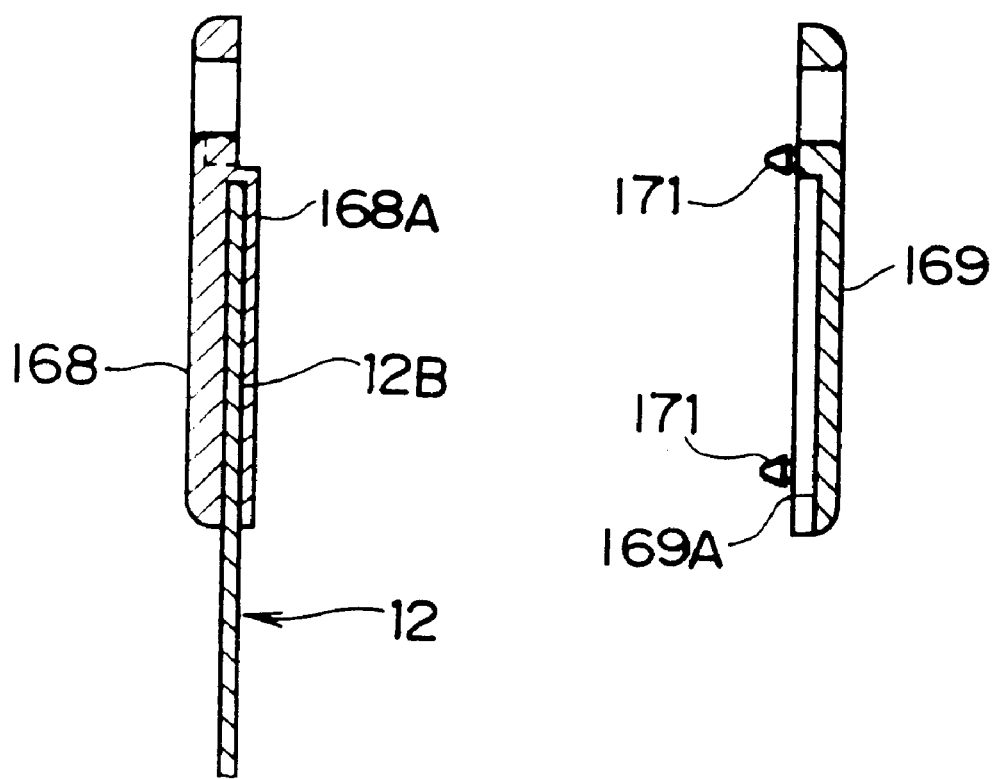
FIG. 41 is a cross-sectional side views corresponding to the cross-sections taken along the lines A—A and B—B in FIG. 40 illustrating a separated state of the resin container according to the fourteenth embodiment.

The fourteenth embodiment according to the present invention is illustrated in FIGS. 39 through 41.

In this embodiment, a hard resin container 166 is separable into resin containers 168 and 169. A thick portion 168A in which the base portion 12B of the key body 12 is accommodated is provided in the resin container 168 and the base portion 12B is insert-molded in the thick portion 168A. A recess 168B in which one half of the transmitting element 18 is accommodated is formed in parallel with the thick portion 168A. The resin container 169 and the resin container 168 are fitted together to form an external configurations similar to the resin containers in the above-described embodiments. A recess 169A in which the thick portion 168A is accommodated and a recess 169B in which the other half of the transmitting element 18 is accommodated are formed at the surface to be fitted with the thick portion 168A. Further, protrusions 171 having enlarged portions at each distal end thereof formed on the resin container 169 are inserted into recesses 172 formed in the resin container 168 so that the resin containers 168 and 167 are mechanically connected each other, and the soft resin outer skin 134 is molded on the outer periphery thereof.

Accordingly, the transmitting element 18 is not subjected to any pressure or external force when the transmitting element 18 is built-in in the resin containers 168 and 169, and further, the resin container 166 thus formed absorbs the heat and pressure generated when the resin outer skin 134 is molded so that transmitting element 18 is protected therefrom.

In this embodiment, dimensions and materials of the transmitting element 18, and the recesses 168B and 169B are taken into consideration so that the transmitting element 18 is firmly maintained without rattling in the recesses 168B and 169B without applying any external force.

(Fifteenth Embodiment)

A fifteenth embodiment corresponds to a structure according to claims 3 and 6.

Figure 42:
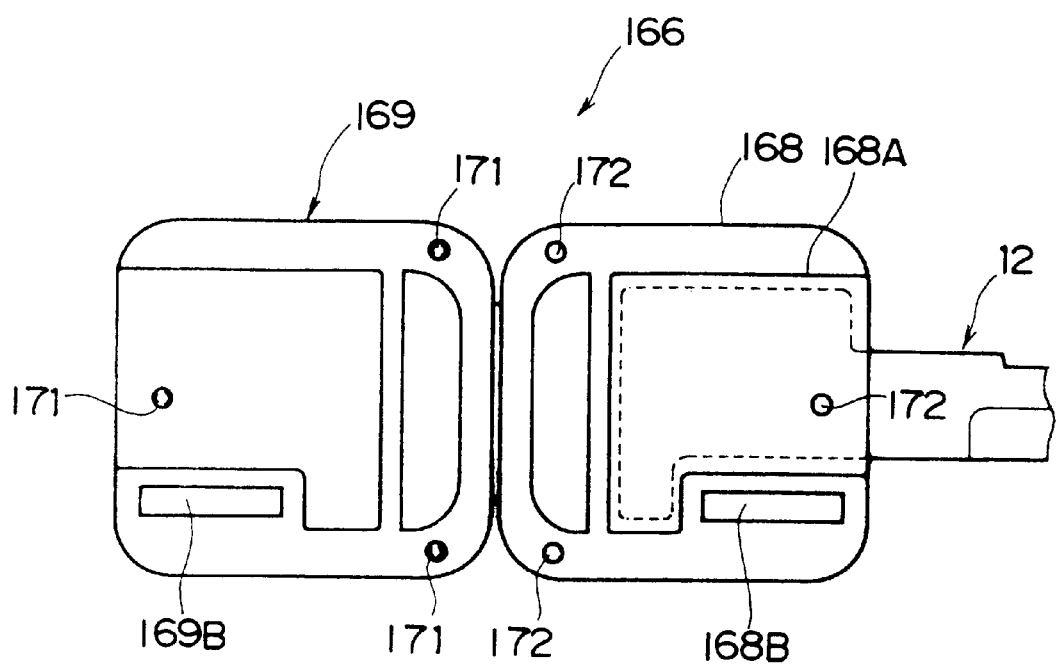
FIG. 42 is an exploded plan view of a resin container according to a fifteenth embodiment.
Figure 43:
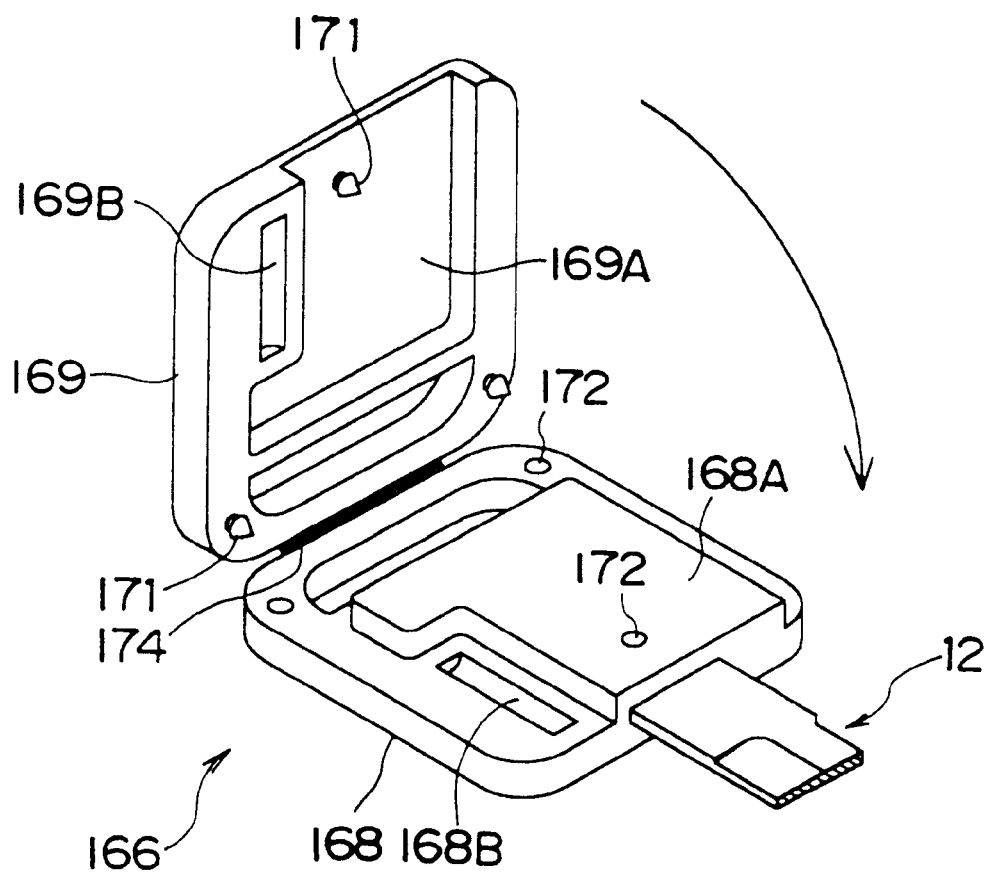
FIG. 43 is a perspective view of the resin container illustrating a state being assembled according to the fifteenth embodiment.

The fifteenth embodiment according to the present invention is shown in FIGS. 42 and 43.

In this embodiment, the resin containers 168 and 169 of the above-described fourteenth embodiment are connected each other by an integral hinge 174 to form an opening and closing structure. That is, the resin containers 168 and 169 are integrally molded with the integral hinge 174. The resin containers 168 and 169 are changed from an opened state in which the resin containers 168 and 169 are apart from each other to a closed state in which the resin containers 168 and 169 are fitted each other by deforming the integral hinge 174. A soft resin outer skin similar to the above-described embodiments is molded on the resin container 166 thus formed in the similar way as the above embodiments.

(Sixteenth Embodiment)

A sixteenth embodiment corresponds to A structure according to claim 7.

Figure 44:
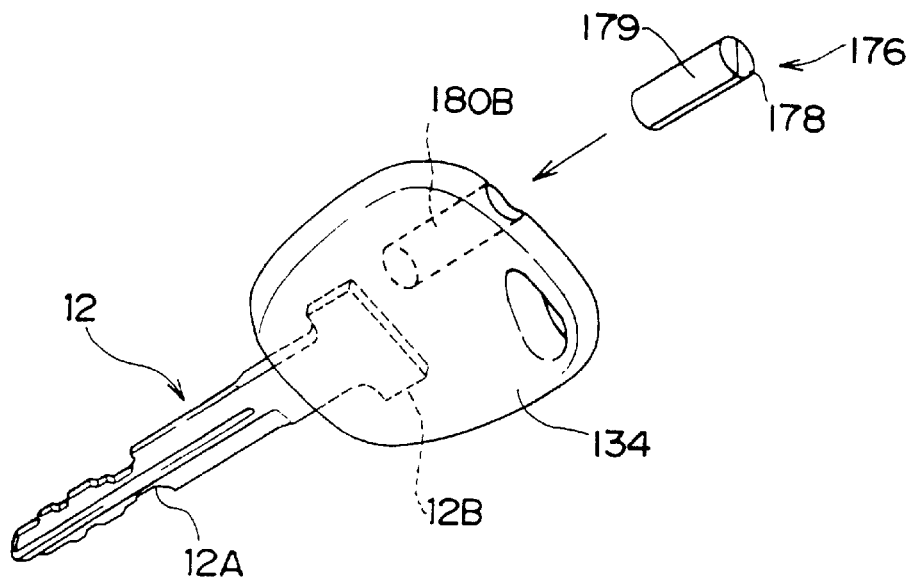
FIG. 44 is an exploded perspective view of a key according to a sixteenth embodiment.
Figure 45:
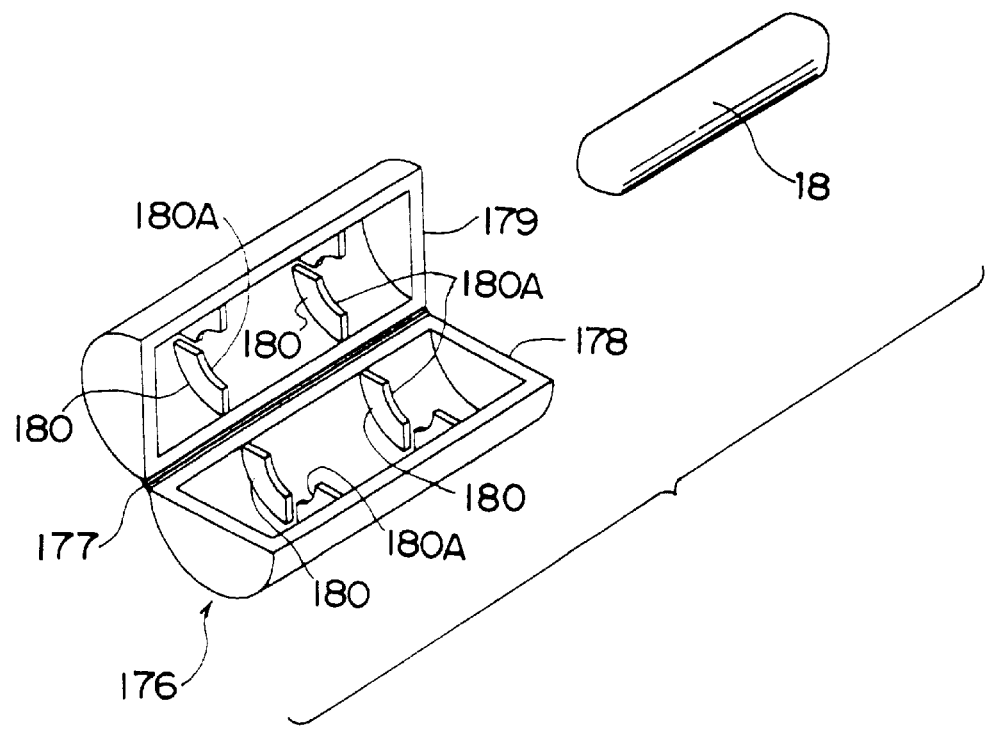
FIG. 45 is a perspective view of a hard resin container for a transmitting element in an opened state according to the sixteenth embodiment.

The sixteenth embodiment of the present invention is shown in FIGS. 44 and 45.

A resin container 176 is used in this embodiment. The resin container 176 comprises a hard resin container 178 and a resin container 179 which are connected by an integral hinge 177, each of the resin containers 178 and 179 being splitted cylindrical rod shaped. The externals of these resin containers 178 and 179 are semi-cylindrical rod shaped and the insides thereof are hollow. Ribs 180 are provided in the perpendicular direction to the axial direction of the semi-cylindrical rods and the transmitting element 18 is held by means of insertion, force fitting adhesion or the like in the recesses 180A formed in the ribs 180. Accordingly, the resin containers 178 and 179 are fitted together with the integral hinge 177 to form a cylindrical rod shape so that the transmitting element 18 can be held therein. The resin container 176 is insert-molded together with the base portion 12B of the key body 12 in the soft resin outer skin 134 so that the key 10 with the transmitting element 18 sealed therein similar to the above-described embodiments can be obtained. Further, in this embodiment, the resin container 176 may not be insert-molded in the resin outer skin 134, but only the base portion 12B of the key body can be embedded in the resin outer skin 134 by insert molding and a cylindrical hole 180B can be formed during the molding or after the molding. Thereafter, the resin container 176 can be inserted and fixed into the cylindrical hole 180B by force fitting or adhesion after the resin outer skin 134 has been molded.

(Seventeenth Embodiment)

A seventeenth embodiment corresponds to a structure according to claims 8 to 11.

Figure 46:
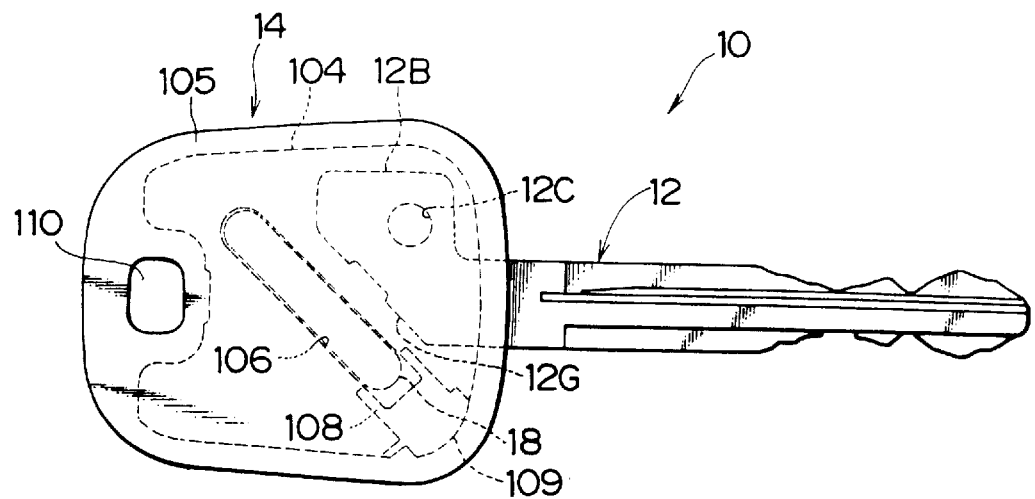
FIG. 46 is a front view of a key according to a seventeenth embodiment.

As shown in FIG. 46, the key 10 is provided with the key body 12. A cut portion 12G is formed in the base portion 12B of the key body 12 at a predetermined angle (45° in this embodiment) inclined to the longitudinal direction (the right and left direction in FIG. 46) of the key body 12. Further, a holding hole 12C is formed in the base portion 12B. A key knob 14 as a grip portion is formed in the key 10.

Figure 47:
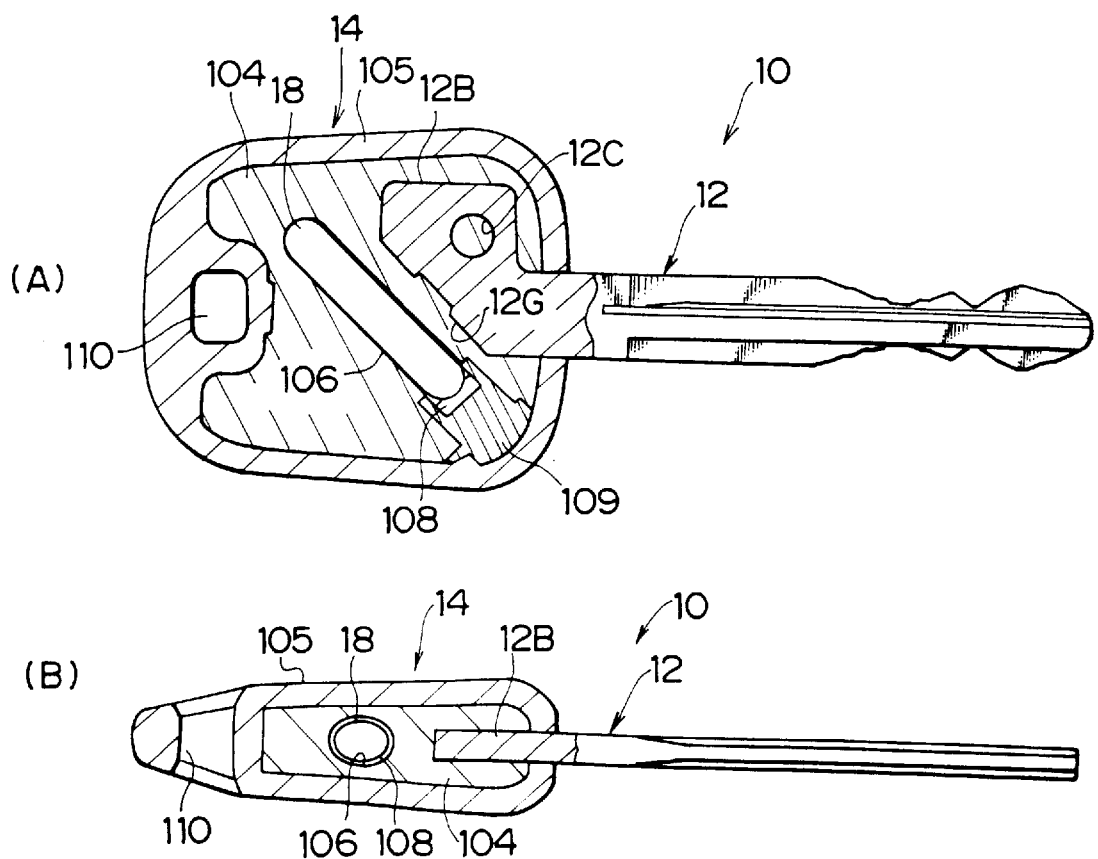
FIG. 47 (A) is a cross-sectional plan view of the key according to the seventeenth embodiment and FIG. 47 (B) is a cross-sectional view of the seventeenth embodiment.

As shown in FIGS. 47A and 47B, the key knob 14 comprises a holder portion 104 and a protector portion 105 which covers the holder portion 104. The holder portion 104 is made from high rigid resin, for instance, polybutylenetelephtalate (PBT). The holder portion 104 formed by insert molding covers the base portion 12B of the key body 12. In the insert molding according to this embodiment, the key body 12 is placed in a forming mold and the base portion 12B is embedded in the holder portion 104 as a molded product after molding.

The protector portion 105 is made from soft resin, for example, polyvinylchloride (PVC), and is formed to cover the holder portion 104 by insert molding in the similar manner to the above.

Figure 48:
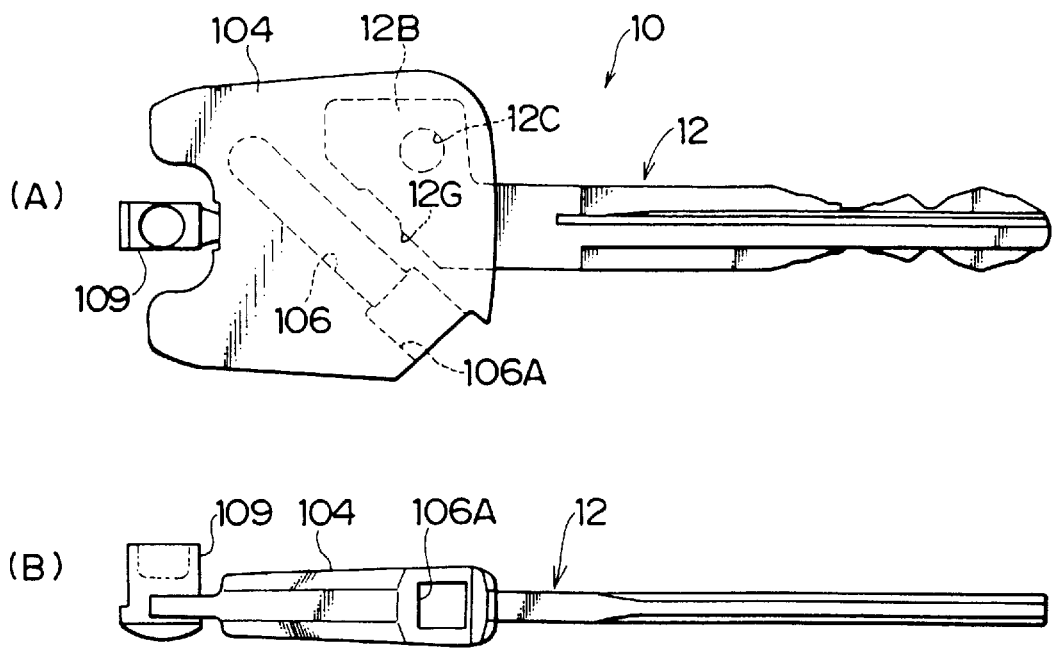
FIG. 48 (A) is a front view of a holder portion and FIG. 48 (B) is a side view of the holder portion.
Figure 49:
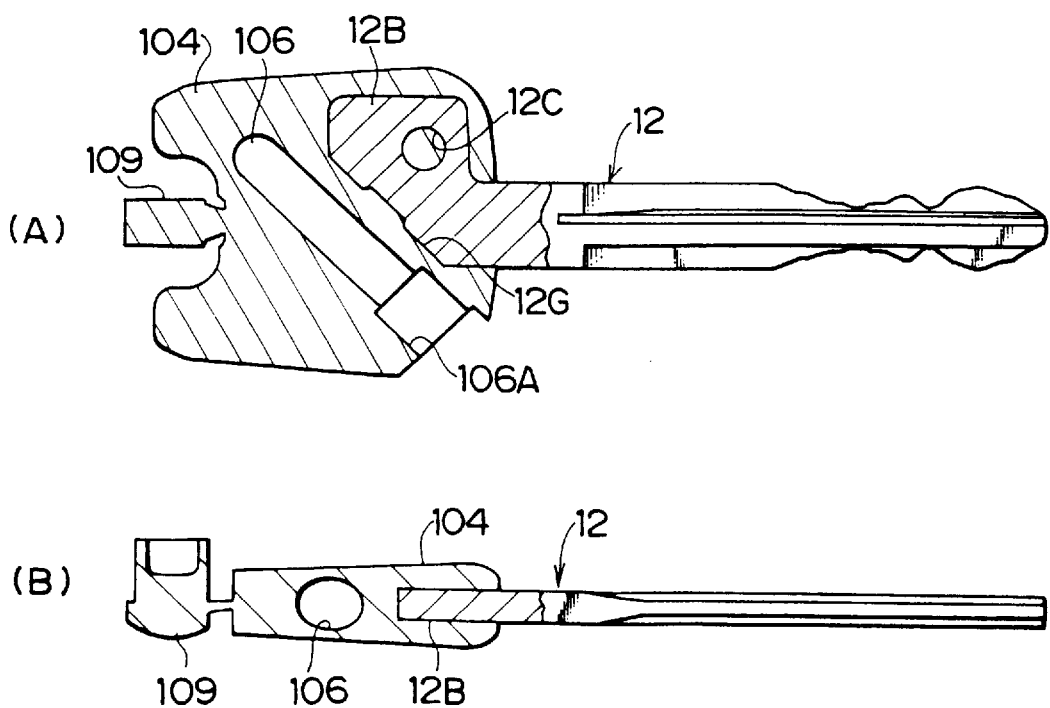
FIG. 49 (A) is a cross-sectional plan view of the holder portion and FIG. 49 (B) is a cross-sectional side view of the holder portion.

An accommodation hole 106 as an accommodation portion is formed in the holder portion 104. The accommodation hole 106 is formed in parallel with the cut portion 12G of the key body 12, that is, is formed at 45° inclined to the longitudinal direction of the key body 12, and an opening 106A (see FIG. 48) is formed toward the distal end of the key 10 (the right side in FIG. 46). The transmitting element 18 is accommodated in the accommodation hole 106.

The transmitting element 18 of this embodiment is enclosed in a cylindrical glass tube, the both ends thereof being formed in a hemi-spherical shape and closed. The vehicle engine is actuated only when an ID code which is transmitted from the transmitting element 18 and is received by a receiving element coincides with the ID code stored in the memory, as described in embodiment 1. In addition, an unillustrated magnetism generating device is operated in the state that the key 10 is inserted into the key cylinder 24.

The transmitting and receiving coil 54 (see FIG. 6) is disposed in the transmitting element 18 along the longitudinal direction thereof. The transmitting and receiving coil 54 can most effectively convert the received magnetism to electric power when the coil 54 is disposed in parallel with the key 10 in the state that the key 10 is inserted into the key cylinder. The transmitting and receiving element 54 can effectively convert the received magnetism to electric power even if the transmitting and receiving coil 54 is disposed up to 45° inclined to the key body 12.

When the transmitting element 18 is disposed so as to be the transmitting and receiving coil 54 in parallel with the key body 12, the key knob 14 is necessary to be long for accommodating the transmitting element 18, since the transmitting element 18 is long, while the length of the key knob 14 is limited in itself. However, when the transmitting element 18 is disposed at 45° inclined to the key body 12, the received magnetism can effectively be converted to electric power and the length of the key knob 14 can be shortened as well.

For the purpose of transmitting an electric wave from the transmitting element 18 to the receiving element without disturbance by the metal-made base portion 12B, the transmitting element 18 is necessary to be separated from the base portion 12B in a predetermined distance (a few millimeter). To this end, the accommodation hole 106 is formed in such a manner that the longitudinal direction of the transmitting element 18 becomes in parallel with the cut portion 12G of the key body 12 when the transmitting element 18 is accommodated in the accommodation hole 106 and a predetermined distance can be maintained between the accommodation hole 106 and the cut portion 12G.

A predetermined quantity of an adhesive 108 is injected into the accommodation hole 106, and the transmitting element 18 is inserted into the accommodation hole 106. Accordingly, the space between the transmitting element 18 and the inner surface of the accommodation hole 106 is filled with the adhesive 108. In this embodiment, silicone is used as an adhesive. The silicone is a thermal resistant synthetic polymer compound constituted by elements comprising silicon, carbon, hydrogen and oxygen, etc., and after the silicone is hardened, the softness thereof is still retained at a low temperature.

A cap portion 109 as a closing member is fitted into an opening 106A of the accommodation hole 106 so that the accommodation hole 106 is closed by the cap portion 109. The quantity of the adhesive 108 injected into the accommodation hole 106 is predetermined such that the gap formed between the transmitting element 18 inserted into the accommodation hole 106 and the cap portion 109 is fully filled with the adhesive 108.

As shown in FIGS. 48(A), 48(B), 49(A) and 49(B), the cap portion 109 is integrally molded with the holder portion 104 when the holder portion 104 is formed at the base portion 12B of the key body 12 by insert molding. Thereafter, the cap portion 109 is separated from the holder portion 104 and fitted into the opening 106A of the accommodation hole 106

Further, the protector portion 105 is formed to cover the holder portion 104 in the state that the accommodation hole 106 is closed by the cap portion 109.

Figure 51:
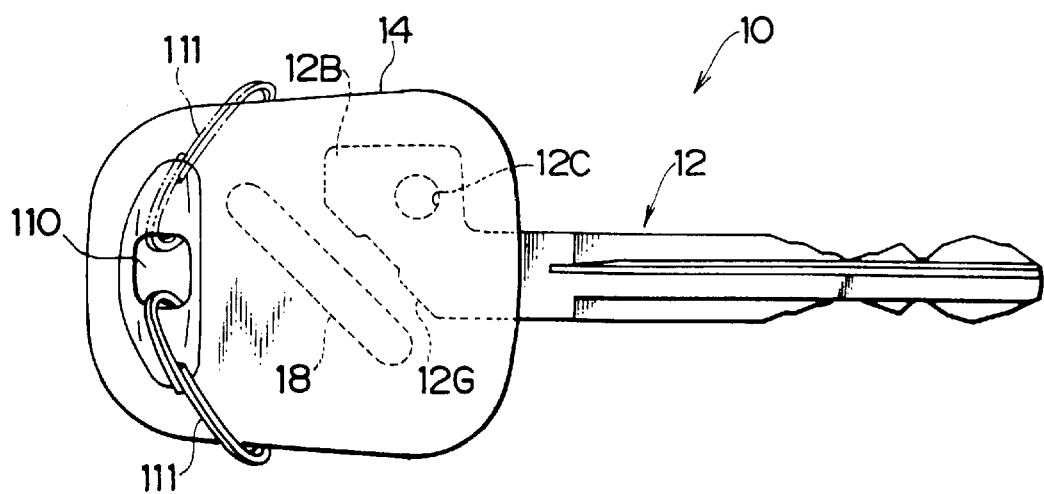
FIG. 51 is a front view of the key in an operating condition according to the seventeenth embodiment.

As shown in FIG. 51, an insertion hole 110 is formed at the base end side (left side in FIG. 51) of the protector portion 105 so as to be able to attach a key ring 111 thereto. When the key ring 111 is disposed at the top end of the key 10 as shown by the solid lines and the two-dotted chain lines in FIG. 51, the key ring 111 overlaps the transmitting element 18 so that the transmitting element 18 cannot receive the magnetism, if the transmitting element 18 is disposed at the both sides (the upper side or the lower side in FIG. 51) of the key knob 14. However, by placing the transmitting element 18 with inclination at 45° at the center of the key knob 14, the key ring 111 does not overlap the transmitting element 18 so that the transmitting element 18 can receive the magnetism.

When the key 18 is manufactured according to the present embodiment, the holder portion 104 to cover the base portion 12B of the key body 12 is molded by insert molding in the first place. That is, the key body 12 is placed in a mold. After molten polybutylenetelephthalate (PBT) is force-injected into the mold, the PBT is hardened. The holder portion 104 made from the hardened PBT having the accommodation hole 106 is formed on the base portion 12B of the key body 12. At this time, the cap portion 109 is simultaneously formed on the holder portion 104 such that the cap portion 109 is connected to the holder portion 104. Accordingly, the cap portion 109 is formed in the same numbers as those of the holder portion 104 so that the cap portion 109 is manufactured in proper quantities and labor for collating the numbers of the cap portion 109 with those of the holder portion 104 can be saved. Further, since the cap portion 109 is connected to the holder portion 104, the cap portion 104 will not be lost. In addition, the holder portion 104 is directly formed on the base portion 12B of the key body 12 so that gap between the key body 12 and the holder portion 104 is not formed. Further, the PBT is force-injected into the holding hole 12C formed in the base portion 12B of the key body 12 and is hardened so that the key plate is not rattle.

Figure 50:
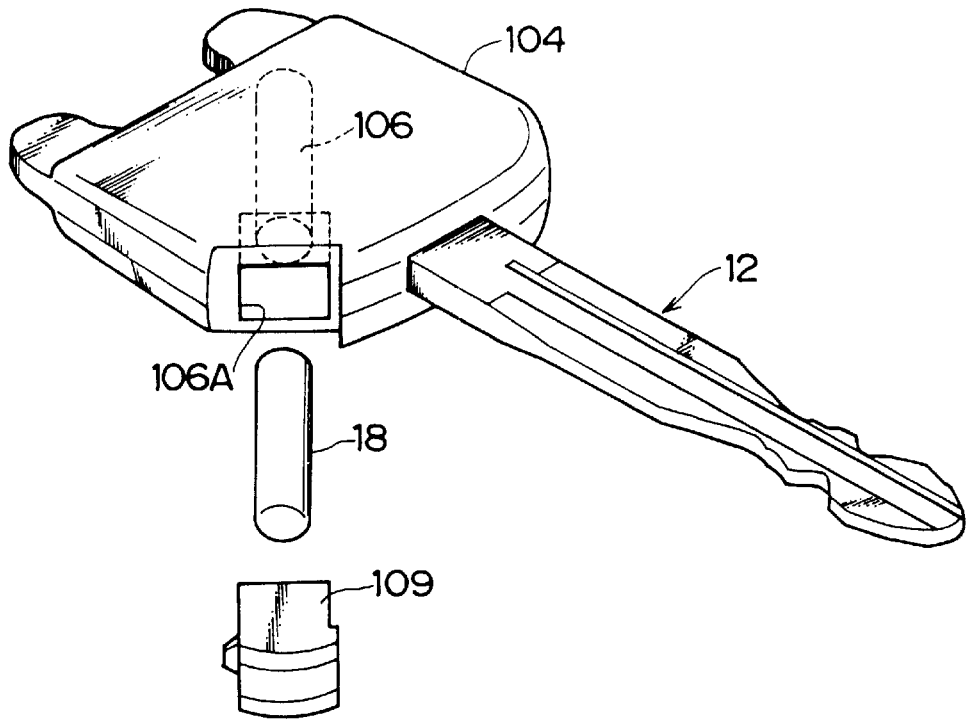
FIG. 50 is an exploded perspective view of the holder portion.

Next, a predetermined quantity of an adhesive 108 is injected into the accommodation hole 106 and the transmitting element 18 is inserted into the accommodation hole 106 as shown in FIG. 50. The cap portion 109 is cut away from the holder portion 104 and the cap portion 109 is fitted into the opening 106A to close the accommodation hole 106. Gaps among the transmitting element 18, the inner surface of the accommodation hole 106 and the cap portion 109 are then filled with the adhesive 108, and the adhesive filled in the accommodation hole 106 is hardened. The adhesive 108 maintains softness to some extent even after the adhesive 108 is hardened so that the adhesive 108 becomes a buffering agent. Accordingly, a shock such as drop or the like is mitigated by the adhesive so that breakage of the transmitting element 18 due to the shock can be prevented.

Next, the protector portion 105 to cover the holder portion 104 is formed by insert molding. That is, the holder portion 104 in which the transmitting element 18 is accommodated is placed in a forming mold and molten polyvinylchloride (PVC) is force-injected into the forming mold. Thereafter, the PVC is hardened. At this time, the transmitting element 18 is accommodated in the holder portion 104 and does not directly contact the molten polyvinylchloride (PVC) so that damage of the transmitting element 18 can be prevented. By removing the molded element from the forming mold, the key 10 in which the transmitting element 18 completely embedded in the resins of the protector portion 105 and the holder portion 104 constituting the key knob 14 is formed. The transmitting element 18 is in the state that the transmitting element 18 is embedded in the interior of the key knob 14 with the resin so that there is no concern that the transmitting element 18 is removed from the key knob 14. Since the transmitting element 18 accommodated in the key 10 in the this embodiment is not required to be provided with a battery and to be replaced thereof, there are no problems although the transmitting element 18 is embedded in the resin. Further, since the transmitting element 18 molded in the resin is highly water resistant, for example, even if the key is dropped into water, water does not enter into the key so that a malfunction of the transmitting element 18 can be prevented.

The transmitting element 18 embedded in the key knob 14 of the key 10 thus manufactured is disposed in the state that the transmitting element 18 is apart from the base portion 12B of the key body 12 at a predetermined distance (a few millimeters) via the holder portion 104. Further, the transmitting element 18 is secured by the adhesive 108 filled in the holding hole 106 without rattling in the holding hole. In addition, since the adhesive 108 maintains softness after the adhesive is hardened, a shock from the exterior is absorbed by the adhesive and is not transferred to the transmitting element 18 so that the breakage of the transmitting element 18 can be prevented.

Furthermore, the accommodation hole 106 in which the transmitting element 18 is accommodated is closed by the cap portion 109 so that the pressure of the PVC to be force-injected into the mold is not directly applied to the transmitting element 18 when the protector portion 105 is molded. Accordingly, the breakage of the transmitting element 18 due to the pressure during insert molding can be prevented.

When an engine is actuated by the use of the key 10 manufactured by the above-described processes, the key 10 is first inserted into the key cylinder and then the key 10 is rotated. During the rotating operation, a stress in the distorting direction is applied to the key knob 14. However, since the holder portion 104 of the key knob 14 is made of high rigid resin, the key knob 14 is not distorted, even if the key knob 14 is subjected to such distortional stress. Accordingly, even if the key 10 is used and the rotational operation is repeated for a long period of time, the key body 12 does not become unsteady.

When the key 10 is inserted into the key cylinder, an unillustrated magnetism generating device at the key cylinder side generates magnetism. When the magnetism is received by the transmitting element 18, an ID code previously stored is transmitted. At this time, the transmitting and receiving coil 54 is disposed to be extended along the insertion direction of the key 10 so as to be susceptible to the magnetism so that the electric power for transmitting the ID code can effectively be obtained. Further, since the transmitting element 18 is separated from the metal base portion 12B in a predetermined distance (a few millimeters), the transmitted electric wave is not disturbed by the metal key body 12 so that the ID code can reliably received by the receiving element at the key cylinder side.

The ID code received by the receiving element is compared with the ID code previously stored, and the engine is actuated by rotating operation of the key only when the both IC codes coincide with one another. If the both ID codes do not coincide with one another, for example, ignition by an ignition coil, fuel ejection operation by an EFI or an actuation operation by a starter does not occur and the engine is not actuated so that the movement of a vehicle due to direct connection of electric wires or mechanical destruction can be prevented.

Further, the protector portion 105 is made from PVC which is a soft resin material so that the key knob 14 is soft to the touch. If the key 10 is inadvertently dropped, the shock due to drop is absorbed by the protector portion 105 formed by the soft resin material and the adhesive 108 filled in the accommodation hole 106 so that the damage of the transmitting element 18 can be prevented.

As described in the above, according to the key 10 in the present embodiment, the holder portion 104 made from a high rigid resin is formed on the base portion 12B of the key body 12 by an insert molding process. Accordingly, the holder portion 104 is formed directly on the base portion 12B of the key body 12 so that a gap between the base portion 12B and the holder portion 104 is not present, and looseness of the key body 12 during the use of the key 10 can be prevented.

Furthermore, the accommodation hole 106 is formed in the holder portion 105 when it is insert-molded, and at the same time, the cap portion 109 to be fitted in the accommodation hole 106 is formed integrally with the holder portion 104. Accordingly, the same number of the cap portion 109 as the number of the holder portion 104 can be formed so that the cap portion 109 can be formed in the proper quantities and labor for collating the number of the cap portion 109 with the number of the holder portion 104 can be omitted. In addition, the cap portion 109 is formed integrally with the holder portion 104 so that missing of the cap portion 109 can be prevented.

After the adhesive 108 is injected into the accommodation hole 106 and the transmitting element 18 is inserted into the accommodation hole 106, the accommodation hole 106 is closed by the cap portion 109 separated from the holder portion 104. The protector portion 105 is formed on the holder portion 104 by insert molding, which has been closed by the cap portion 109, to cover the holder portion 104. Accordingly, the transmitting element 18 is accommodated in the accommodation hole 106 closed by the cap portion 109 so that the heat of PVC to form the protector portion 105 is not directly conducted to the transmitting element 18 when the protector portion is formed by insert molding and damage of the transmitting element 18 can be prevented.

In the present embodiment, the accommodation hole 106 as an accommodating portion is formed so as to form the opening 106A at the distal end side of the key 10. However, the opening 106A may be formed at the base end side (the left side of the key in FIG. 46) of the key 10. Further, the accommodation hole 106 may be formed so as to form the opening 106A in the direction of the thickness of the key 10 (either at the front side or at the reverse side of FIG. 46).

Furthermore, in the present embodiment, the accommodation hole 106 is simultaneously formed at the time when the holder portion 104 is formed by insert molding, but the holder portion 104 may be formed by insert molding and thereafter, the accommodation hole 106 may be bored in the holder portion 104 thus formed by a secondary forming (secondary fabrication).

In the present embodiment, the cap portion 109 is molded at the time when the holder portion 104 is molded by the insert molding so as to connect the cap portion 109 to the holder portion 104, but the molding of the holder portion 104 and the molding of the cap portion 109 may be made independently.

The materials of the holder portion 104 and the protector portion 105 may optionally be changed to other materials such as hydrocarbon resins including polyethylene (PE), polypropylene (PP), acrylnitrile-butadiene-stylene copolymer (ABS) and the like, acrylic resins, halogen containing resins including fluorine resin (TFE) and the like, polyether resins, amino resins including urea resin (UF), melamine resin (MF), and the like, polyester resins including polyethylenetelephthalate (PET), polycarbonate (PC), and the like, polyamide resins (PA) including nylon and the like, polyurethane resins including polyurethane (PUR) and the like, phenol resins, epoxy resins, cellulose resins including acetyl-cellulose resin (CA), acetyl-butyril-cellulose resin (CAB) and the like, and protein resins including casein resin (CS) and the like.

Further, silicone is used as an adhesive 108 in the present embodiment, but any types of other adhesives which are thermal resistant and which maintain softness after hardened can be used. Furthermore, materials such as gels other than materials which can be used as adhesives may be used.

Plasticizers can optionally added to the resin such as PVC which forms the protector portion 105 so that rubber-resilience is added to the key knob 14 and the touch feel of the key knob 14 is improved.

As is clear from the description in the above, the following technical features are included in the present invention:

(1) In the key with built-in transmitting element described in claims 10 and 11, the accommodation portion is formed such that the transmitting element to be accommodated in the accommodation portion can be disposed at a predetermined angle to the key plate. With this structure, the magnetism can effectively be received.

(2) In the key with a built-in transmitting element described in any one of claims 8 through 11 and (1) above, an adhesive which maintains softness after the adhesive is hardened is injected into the accommodation portion. According to this structure, shock from outside can be lessened and breakage of the transmitting element can be prevented.

In addition, the above embodiments can be applied to the key with a built-in transmitting element other than the key for vehicles. For example, these embodiments are applicable to a door key which transmits an ID code for identifying residents in a building, a locker key which transmitts a secret code, and the like.

Further, in the above embodiments, the transmitting element is built-in in the key knob, but various types of electronic components which are not limited to the transmitting element can be embedded in the key knob.

Furthermore, unevenness, marks or the like for avoiding slip may be provided on the key knob 14 of the key 10 in the above embodiments.

In the above embodiments, the key 10 is inserted into the key cylinder 24 provided in the steering column 22, but a magnetism generating device and a receiving element may be disposed in the key cylinder side of a door so that the lock of the door can be unlocked by an electronic lock mechanism by an ID code transmitted from the key 10.

What is claimed is:

1. In a key with a transmitting element in which a transmitting element is accommodated in a grip portion formed on a base portion of a key body, said grip portion comprising:
    a holder portion which is formed by molding a resin for covering said base portion of said key body;
    an accommodation portion, which includes accommodation holes for accommodating each side of the transmitting element, and which is formed in said holder portion for accommodating said transmitting element;
    a closing member for closing said accommodation portion by being inserted into an opening of said accommodation portion when said transmitting element has been positioned in said accommodation portion; and
    a protector portion, which is formed by molding a resin, for covering said holder portion after said accommodation portion of the holder portion is closed by said closing member.

2. A key with a built-in transmitting element according to claim 1, wherein said closing member is integrally formed with said holder portion when said holder portion is formed.

3. A key with a built-in transmitting element according to claim 1, wherein said accommodation portion is formed so that said transmitting element accommodated in said accommodation portion is separated from said key body by a predetermined distance.

4. A key with a built-in transmitting element according to claim 2, wherein said accommodation portion is formed so that said transmitting element accommodated in said accommodation portion is separated from said key body by a predetermined distance.

5. A key, comprising:
    a metal key body having an insertion portion;
    a resilient non-metal covering member;
    cylindrical accommodation holes formed in said covering member and said key body in predetermined dimensions;
    a transmitting element accommodated in a sealed condition in an accommodation portion which includes said accommodation holes and is formed by the combination of said key body and said resilient non-metal covering member; and
    a soft outer skin which is formed on the outer surface of said resilient non-metal covering member and said key body and which connects said resilient covering member and said key body, wherein the resilient non-metal covering member further defines a U-shaped groove, the U-shaped groove extending in a mounting direction in the resilient non-metal covering member;
    and further including projections provided at the inside of a distal end portion of the U-shaped groove, the projections clasping and fitting a side surface of the top end of the metal key body in an insertion direction.

6. A key including a transmitting element accommodated in a grip portion formed on a base portion of a key body, said grip portion comprising:
    a holder portion formed of a first resin covering said base portion of said key body;
    an accommodation portion, including an accommodation hole for accommodating the transmitting element, formed in said holder portion for accommodating said transmitting element;
    a closing member for closing said accommodation portion by being inserted into an opening of said accommodation portion when said transmitting element has been positioned in said accommodation portion; and
    a protector portion, formed of a second resin, covering said holder portion after said accommodation portion of the holder portion is closed by said closing member, wherein a longitudinal direction of said accommodation portion is inclined to a longitudinal direction of said key body at a predetermined angle.

7. The key with a transmitting element according to claim 6, wherein said base portion of said key body includes a cut portion, said cut portion being formed in said base portion of said key body at a predetermined angle inclined to the longitudinal direction of said key body.

8. The key with a transmitting element according to claim 7, wherein the longitudinal direction of said accommodation portion is substantially parallel with said cut portion.

9. The key with a transmitting element according to claim 6, wherein a hardness of the first resin is greater than a hardness of the second resin.

10. The key with a transmitting element according to claim 6, wherein the transmitting element is accommodated in said accommodation portion so as to be inclined to the longitudinal direction of said key body at the predetermined angle.

11. The key with a transmitting element according to claim 6, wherein an adhesive member is injected into said accommodation portion.

12. The key with a transmitting element according to claim 11, wherein said adhesive member is injected into said accommodation portion such that a gap formed among an inner surface of the accommodation hole, said closing member being inserted into the opening and the transmitting element being accommodated in the accommodation hole is fully filled with said adhesive member.

13. The key with a transmitting element according to claim 11, wherein said adhesive member is a silicone.

14. The key with a transmitting element according to claim 11, wherein said adhesive member is a material whose softness is retained after being hardened.

15. The key with a transmitting element according to claim 6, wherein the predetermined angle is about 45°.

16. A key with a transmitting element accommodated in a grip portion formed on a base portion of a key body, said grip portion comprising:
- a holder portion for covering said base portion of said key body;
- an accommodation portion, including an accommodation hole for accommodating the transmitting element, formed in said holder portion for accommodating the transmitting element;
- a closing member for closing said accommodation portion by being inserted into an opening of said accommodation portion when the transmitting element has been positioned in said accommodation portion; and
- a protector portion for covering said holder portion after said accommodation portion is closed by said closing member, wherein said closing member and said holder portion are formed from a resin, and said closing member is integrally molded with said holder portion when said holder portion is formed at said base portion of said key body.

17. The key with a transmitting element according to claim 16, wherein said holder portion is formed at said base portion of said key body by insert molding, and said cap member is separatable from said holder portion such that said cap member separated from said holder portion can close the opening of said accommodation portion.

18. The key with a transmitting element according to claim 16, wherein a longitudinal direction of said accommodation portion is inclined to a longitudinal direction of said key body at a predetermined angle.

19. The key with a transmitting element according to claim 16, wherein said base portion of said key body includes a cut portion, said cut portion being formed in said base portion of said key body at a predetermined angle inclined to the longitudinal direction of said key body.

20. The key with a transmitting element according to claim 19, wherein the longitudinal direction of said accommodation portion is substantially parallel with said cut portion.

\* \* \* \* \*